(12) United States Patent
Laker et al.

(10) Patent No.: US 9,199,439 B2
(45) Date of Patent: *Dec. 1, 2015

(54) EFFICIENT LAMINATION PRESS WITH THIN FLEXIBLE PLATENS

(71) Applicant: 3form, Inc., Salt Lake City, UT (US)

(72) Inventors: Matthew B. Laker, West Valley City, UT (US); Raymond L. Goodson, Sandy, UT (US)

(73) Assignee: 3form, LLC, Salt Lake City, UT (US)

( * ) Notice: Subject to any disclaimer, the term of this patent is extended or adjusted under 35 U.S.C. 154(b) by 535 days.

This patent is subject to a terminal disclaimer.

(21) Appl. No.: 13/649,958

(22) Filed: Oct. 11, 2012

(65) Prior Publication Data

US 2013/0032290 A1    Feb. 7, 2013

Related U.S. Application Data

(63) Continuation-in-part of application No. 13/054,461, filed as application No. PCT/US2009/051425 on Jul. 22, 2009, now Pat. No. 8,337,652, and a continuation-in-part of application No. 13/054,059, filed as application No. PCT/US2009/051396 on Jul. 22, 2009, now Pat. No. 8,333,859.

(60) Provisional application No. 61/082,767, filed on Jul. 22, 2008.

(51) Int. Cl.
  *B32B 37/00*   (2006.01)
  *B32B 37/10*   (2006.01)
  *B30B 1/00*    (2006.01)
  *B30B 15/06*   (2006.01)

(52) U.S. Cl.
  CPC ............ *B32B 37/10* (2013.01); *B30B 1/003* (2013.01); *B30B 15/064* (2013.01); *B32B 2607/00* (2013.01)

(58) Field of Classification Search
  CPC .... B29C 35/0805; B32B 37/06; B32B 37/08; B32B 37/10; B32B 37/0046; B30B 15/064; B30B 1/003
  USPC ............... 156/228, 498, 499, 580, 581, 583.1
  See application file for complete search history.

(56) References Cited

U.S. PATENT DOCUMENTS 1,549,619 A    8/1925  Steenstrup
2,371,847 A  *  3/1945  Saunders et al. .............. 156/291

(Continued)

FOREIGN PATENT DOCUMENTS

EP    1293271    3/2003
EP    1803547    4/2007

OTHER PUBLICATIONS

International Search Report and Written Opinion on PCT/US09/51396, mailed Sep. 16, 2009.

(Continued)

*Primary Examiner* — James Sells
(74) *Attorney, Agent, or Firm* — Workman Nydegger

(57) ABSTRACT

Implementations of the present invention relate to systems, methods, and apparatus for applying heat and pressure to a laminate assembly and to form a unitary product therefrom with increased processing efficiency. One implementation includes an apparatus that can decrease processing time by directly heating and cooling platens that press the laminate assembly. Additionally, the lamination press can allow the platens to flex about the laminate assembly, thereby applying substantially uniform pressure to the laminate assembly.

25 Claims, 10 Drawing Sheets

(56) References Cited

U.S. PATENT DOCUMENTS

| | | |
|---|---|---|
| 3,029,178 A | 4/1962 | Carver |
| 3,376,808 A | 4/1968 | Beckett |
| 3,950,210 A * | 4/1976 | Gibbs et al. ............... 156/367 |
| 4,217,157 A | 8/1980 | Stoltze |
| 4,311,549 A | 1/1982 | Vercillo |
| 4,336,221 A | 6/1982 | Garabedian |
| 4,421,589 A | 12/1983 | Armini |
| 4,715,923 A | 12/1987 | Knoll |
| 4,923,560 A | 5/1990 | Inselmann |
| 5,112,431 A * | 5/1992 | Gerhardt et al. ........... 156/583.5 |
| 5,562,028 A | 10/1996 | Bielfeldt |
| 5,562,796 A | 10/1996 | Ertel |
| 5,589,026 A | 12/1996 | Pereeman |
| 5,611,269 A | 3/1997 | Bielfeldt |
| 5,628,845 A | 5/1997 | Murray |
| 5,635,014 A | 6/1997 | Taylor |
| 6,030,474 A | 2/2000 | Isono |
| 6,041,840 A | 3/2000 | Ogawa |
| 6,250,217 B1 | 6/2001 | Korybutiak |
| 8,333,859 B2 * | 12/2012 | Laker et al. ............... 156/228 |
| 8,337,652 B2 * | 12/2012 | Laker et al. ............... 156/228 |
| 2005/0056363 A1 | 3/2005 | Takeyama |
| 2011/0120640 A1 | 5/2011 | Laker |

OTHER PUBLICATIONS

International Search Report and Written Opinion on PCT/US09/51425, mailed Oct. 15, 2009.

EPO Search Report and Opinion on Application No. EP 09800937.6 (Mailed Dec. 23, 2011).

EPO Search Report and Opinion on Application No. EP 09800952.5 (Mailed Dec. 23, 2011).

International Search Report and Opinion, PCT/US2013/032961, mailed Jul. 15, 2013.

* cited by examiner

EFFICIENT LAMINATION PRESS WITH THIN FLEXIBLE PLATENS

CROSS-REFERENCE TO RELATED APPLICATIONS

This application is a continuation-in-part of U.S. patent application No. 13/054,461, filed Jan. 14, 2011, entitled "Efficient Lamination Press With Flexible Platens," now U.S. Pat. No. 8,337,652 issued Dec. 25, 2012, which is a 371 National Stage application of PCT Application No. PCT/US09/51425, filed on Jul. 22, 2009, entitled "Efficient Lamination Press With Flexible Platens," which claims the benefit of U.S. Provisional Application No. 61/082,767, filed Jul. 22, 2008, entitled "Lamination Press." This application is a also a continuation-in-part of U.S. patent application No. 13/054,059, filed Jan. 13, 2011, entitled "Efficient Lamination Press With Radiant Heating," now U.S. Pat. No. 8,333,859 issued Dec. 18, 2012, which is a 371 National Stage application of PCT Application No. PCT/US09/51396, filed on Jul. 22, 2009, entitled "Efficient Lamination Press With Radiant Heating," which claims the benefit of U.S. Provisional Application No. 61/082,767, filed Jul. 22, 2008, entitled "Lamination Press." The entire content of each of the aforementioned patent applications is incorporated by reference herein.

BACKGROUND OF THE INVENTION

1. The Field of the Invention

The present invention relates generally to lamination presses for forming resin products, such as panels.

2. Background and Relevant Art

Laminated resin panels have a wide utility in design and architectural applications, including use as walls, partitions, lighting fixtures, displays, etc. Laminated resin materials are popular because they tend to be less expensive than materials such as glass or the like, in many applications where certain structural, optical, and aesthetic characteristics are desired. In addition, laminated resin materials tend to be more flexible in terms of manufacture and assembly, since resin materials are relatively easy to bend, mold, color, shape, cut, and modify in many different ways. One particularly popular technique is to embed decorative layers, such as, for example, fabrics, paper, colored films, printed images, or three-dimensional objects (grass, reed, rocks, flowers, metal, etc.) between translucent resin sheets. These and other resin panels are often produced using heated lamination, which involves the application of pressure and heat to at least partially melt the resin sheets to each other to form a final resin panel product.

Conventional lamination technology, however, can lead to panel damage or imperfections, and can introduce significant overhead and inefficiency into the resin panel production process, as explained in greater detail below. In many conventional lamination processes, a lamination press applies heat and pressure to a stack of sheets of material (often called a layup stack, laminate assembly, sandwich, or a book) to join the sheets together. The lamination press then cools the sheets under pressure to form a resulting unitary product (e.g., a laminated resin panel). In many lamination operations, it is necessary to control the pressing, heating, and cooling of the laminate assembly to ensure proper fusing and the minimization of flaws and stresses in the resulting product.

To press a laminate assembly together, conventional lamination presses typically use large, heavy cast iron platens. In particular, pistons, hydraulic cylinders, or apparatus act on finite contact points on the platens to actuate and press the platens together. Pressure applied to finite contact points can bend, warp, or otherwise deform the platens over time. These imperfections can produce inconsistent pressure along the surface(s) of the laminate assembly, which often results in finished products having an inconsistent gauge, waves, or other deformities. Additionally, normal use can scratch, dent, or otherwise damage the surface of the platens, which can lead to similar corresponding surface damage in products formed by such platens.

One potential solution for damaged platens is to simply replace them. Unfortunately, the material, size, and construction of conventional platens make replacement extremely expensive and otherwise impracticable. Thus, manufacturers typically use tooling plates and/or pressure pads between the laminate assembly and the platens to compensate for any deformities in the platens. The tooling plates and pressure pads can help provide smooth surfaces and produce more uniform distribution of pressure across the laminate assembly. The use of tooling plates and pressure pads, however, also decreases the efficiency of the lamination processes and increases processing times. In particular, manufacturers must spend time and effort to position any tooling plates and pressures pads. Furthermore, the additional layers between the platens and laminate assembly reduce the heat transfer rate to the laminate assembly, and thus, require additional heat, time, and cost.

In addition to the foregoing, conventional pressing processes can create various drawbacks specific to the materials being processed. For example, when embedding three-dimensional objects within resin sheets, traditional pressing processes can smash or otherwise damage the three-dimensional objects. In particular, traditional presses can concentrate a disproportionate amount of pressure on a few of the three-dimensional objects as the resin sheets begin to melt, thereby producing a flawed final product. To avoid this, manufacturers often apply increasing amounts of heat and/or pressure in steps to help ensure the resin sheets melt and form around the three-dimensional objects instead of crushing them. Such stepped processes, however, can significantly increase processing times and overall process overhead.

In addition to the various drawbacks of conventional pressing processes, the heating processes of conventional lamination presses can also present various drawbacks and inefficiencies. Conventional presses typically heat the platens using either a plurality of electrical heating elements embedded within the platens, or by passing hot oil or steam through serpentine fluid channels formed in the platens. Each of these heating methods, however, can in some instances lead to hot spots and uneven heating.

Conventional platens are usually made of cast iron for its heat retention capabilities and for its manufacturability, which allows for the creation of the serpentine fluid channels and/or embedding of the heaters. The cast iron construction of the platens, however, tends to make precise temperature control difficult, requiring significant time and energy to heat or cool the platens to a desired temperature. For this reason, manufacturers often use a "hot" component press and a separate "cold" component press. The use of two component presses allows the manufacturer to maintain both presses at a desired temperature, and avoid the time and energy required to change the platen temperature.

The time and effort needed to transfer the laminate assembly from the hot component press to the cold component press, however, increases production time, creates the potential for damaging the materials, and otherwise adds inefficiency to the lamination process. Furthermore, in such cases the manufacturer will often maintain the heat of the hot component press for extended periods of time, even between jobs.

Heating or maintaining the temperature of the hot component press between jobs, by itself, can lead to significant costs.

Even when using separate hot and cold presses, a manufacturer will often still need to adjust the temperature of a given hot or cold component press depending on the type and gauge of the material being processed. For example, if the manufacturer needs to process both ¼ inch and ½ inch gauge panels, the manufacturer may first adjust the temperature of the press for one gauge, such as the ¼ inch panels. After processing the ¼ inch panel, the manufacturer may then adjust the temperature for the ½ inch gauge panels. As mentioned previously, when using conventional lamination presses, such temperature adjustments tend to be difficult to determine and maintain with precision. Thus, if a site regularly processes a variety of different panel gauges or materials, the time and energy associated with these temperature adjustments can lead to significant manufacturing inefficiency.

Additionally, the cooling processes of conventional lamination processes can add even further inefficiencies and drawbacks to the lamination process. For example, conventional platens are often cooled by running cold liquids or air through the serpentine fluid channels formed in the platens. Uniform cooling of conventional platens can be problematic; however, because the introduction of low temperature cooling fluids into the fluid channels of the platens often cools the platen much faster at the inlet than the outlet. This can prevent the portion of the laminate assembly from properly cooling, require longer cooling time, or otherwise add inefficiencies to the lamination process.

Thus, conventional presses typically require significant front-end work, including a great deal of energy and labor. For example, typical cycles (combined pressing, heating, and cooling) for a given decorative resin panel using conventional lamination presses are in best case scenarios about thirty minutes or more. Such processing times do not include any time required to change the temperature of a press based on the material or gauge of the panel being processed. In addition, such operation cycles often require at least six to eight people.

Accordingly, there are a number of disadvantages in conventional lamination presses that can be addressed.

BRIEF SUMMARY OF THE INVENTION

Implementations of the present invention provide systems, methods, and apparatus for applying heat and pressure to a laminate assembly with increased processing efficiency, while still producing final products with excellent structural and aesthetic properties. In particular, implementations of the present invention include devices and systems that can decrease lamination process times by providing rapid heating and cooling of opposing platens within a single press. Additionally, implementations of the present invention comprise apparatus that can do the same while requiring less energy and labor than conventional lamination processes.

At least one implementation includes a lamination press for heating and pressing together a laminate assembly to form a uniform panel. The lamination press has an upper platen assembly having an upper working surface configured to press against the laminate assembly. The lamination press also has a lower platen assembly having a lower working surface facing the upper working surface, the lower working surface being configured to press against the laminate assembly. Furthermore, each of the upper platen assembly and the lower platen assembly incorporates a first flexible plate having a working surface thereon, the first flexible plate being configured to flex relative to the laminate assembly. Each of the upper and lower platen assemblies also includes a second flexible plate coupled to the first flexible plate, the second flexible plate being configured to flex together with the first flexible plate. Additionally, each of the upper platen assembly and the lower platen assembly has a plurality of grooves disposed in one or more of the first flexible plate and the second flexible plate, the grooves being at least partially sealed between the first flexible plate and the second flexible plate.

One or more implementations include a platen assembly for use in a lamination press for heating and pressing a laminate assembly to form a uniform panel. Such the platen assembly has a substantially rigid plate and a flexible pad in contact with the substantially rigid plate. Additionally, the platen assembly has a flexible platen having a working surface and a non-working surface, the working surface being configured to press against the laminate assembly, the working surface being configured to press the laminate assembly. The flexible platen incorporates a plurality of plates coupled together, the plurality of plate being configured to flex about the laminate assembly. Furthermore, the flexible platen includes a plurality of grooves formed in at least one plate of the plurality of plates, the plurality of grooves being configured to accept heating or cooling medium for heating or cooling the flexible platen.

Implementations of the present invention also include a method of forming a unitary panel by applying heat and pressure to a laminate assembly. The method includes placing the laminate assembly onto a working face of a lower platen assembly of a lamination press, the lower platen assembly being positioned at least partially outside of the lamination press and moving the lower platen assembly into the lamination press and into alignment with an upper platen assembly. The method further includes forming the unitary panel by heating and uniformly pressing the laminate assembly between the lower and upper platen assemblies in a manner that allows one or more of the lower and upper platen assemblies to flex about the laminate assembly. Implementations of the method also include cooling the unitary panel by cooling one or more of the lower platen assembly and the upper platen assembly.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
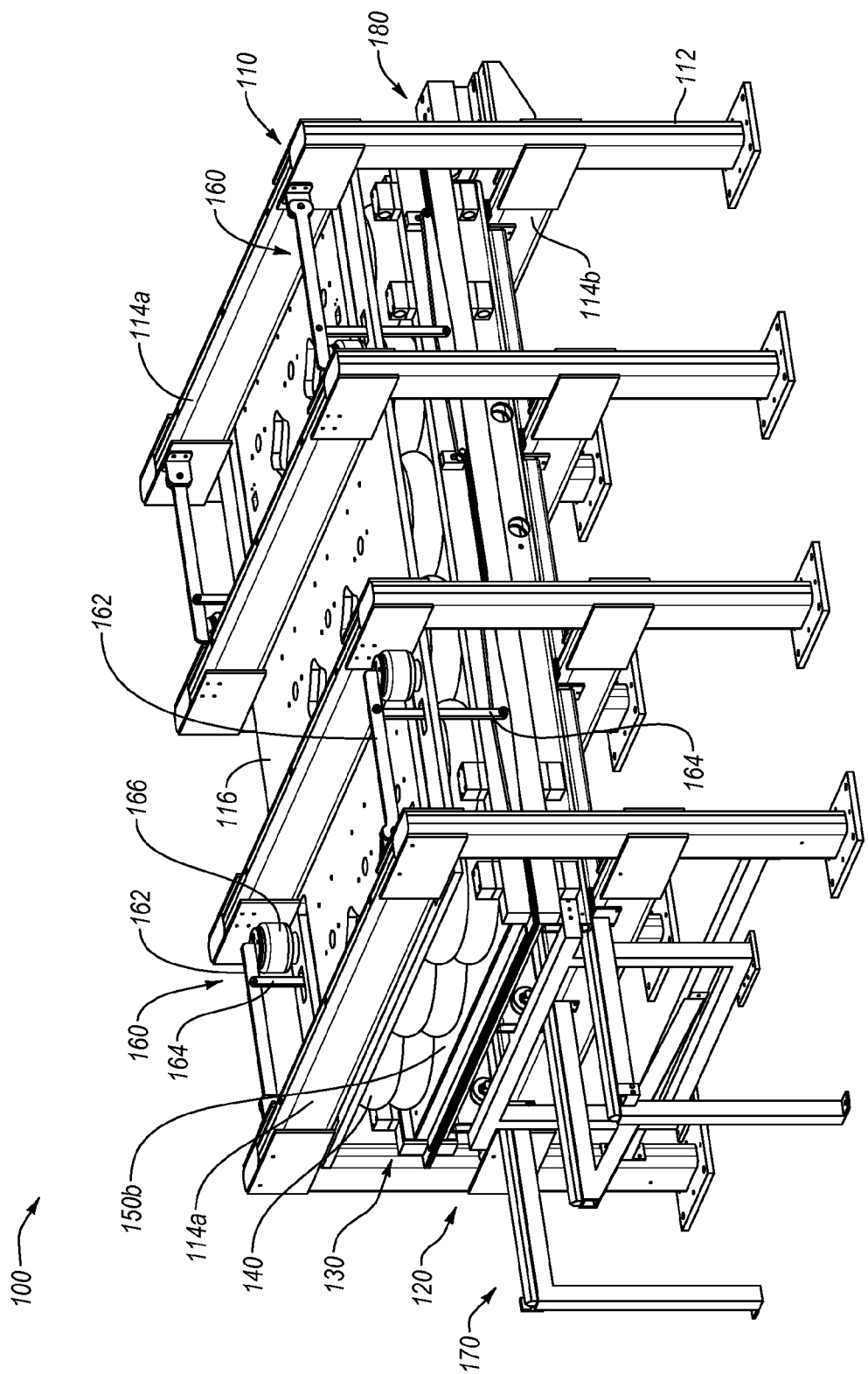
FIG. 1A illustrates a perspective view of a lamination press in accordance with one implementation of the present invention.

Implementations of the present invention provide systems, methods, and apparatus for applying heat and pressure to a laminate assembly with increased processing efficiency, while still producing final products with excellent structural and aesthetic properties. In particular, implementations of the present invention include devices and systems that can decrease lamination process times by providing rapid heating and cooling of opposing platens within a single press. Additionally, implementations of the present invention comprise apparatus that can do the same while requiring less energy and labor than conventional lamination processes.

More specifically, one or more implementations of the present invention include a lamination press that applies substantially uniform pressure across one or more opposing platens, and thereby, eliminates or reduces permanent deformation of platens as well as associated flaws in final products. One will appreciate that, by applying uniform or substantially uniform pressure across at least a majority of the platens, such lamination presses also can reduce or eliminate the need for pressure pads and tooling plates. By eliminating or reducing the need for pressure pads, one or more implementations of the present invention can reduce the processing times.

Additionally, at least one implementation of a lamination press can include flexible platens. Platens with the ability to flex or pivot can reduce platen wear, and help ensure a uniform or substantially uniform distribution of pressure across the surfaces of a laminate assembly. Thus, the flexible platens also can permit elimination of pressure pads and tooling plates and can, thereby, increase lamination speed and efficiency. Also, according to one or more implementations, the flexible platens can adjust or compensate when processing non-planar materials. For example, the ability to flex or pivot can help the platens to apply uniform or substantially uniform pressure across lamination materials that have surface variances, or are otherwise non-planar. This can lead to a similarly even distribution of pressure on materials between opposing resin sheets in a layup assembly.

The platens also can be thin, which can provide for greater flexibility about the laminate assembly. For example, with decreased thickness, the thin platens can flex and/or temporarily deform in response to lower pressure. In one or more implementations, upper and lower platen assemblies of the lamination press can incorporate one or more flexible and/or deformable layers that can separate the platens from rigid plates. Such flexible and/or deformable layers can allow the thin platens to flex and/or deform relative to the rigid plates and can limit the range of such flexing and deformation. More specifically, by choosing thickness, flexibility, and/or deformability of such flexible and deformable layers, the manufacturer can limit the flexibility of the platens to a desired range. Moreover, flexible platens can further facilitate lamination of fragile elements or components within the laminate assembly, without or with minimal damage to such elements or components, by uniformly applying pressure to the laminate assembly.

Furthermore, the manufacturer can heat and/or cool the flexible platens significantly faster than conventional platens. As used herein the terms "flexible platen" or "flexible thin platen" refer to a platen formed from a material that is at least partially rigid, but that can also reversibly flex, bend, or deflect in small degrees in one or more directions in response to applied pressure. For example, a flexible platen according to one or more implementations of the present invention includes at least a portion that can flex or bend away from a planar configuration.

In one implementation, the manufacturer can heat and cool the platens directly. For example, heating or cooling medium (e.g., oil) can flow through multiple grooves formed in at least one plate that forms the platen. As the heating or cooling fluid flows through the grooves, the fluid can transfer heat (respectively) to or from the platens. As the thickness of the platen is reduced, the overall mass of the platens also can be reduced proportionately. Hence, the fluid can transfer the heat to and from the platens at a higher rate. Consequently, as the platens heat and cool faster, so can the laminate assembly.

As an initial matter, the implementations are described herein below primarily with reference to processing of decorative resin panels. One will appreciate, however, that panels, particularly resin-based panels, are only one type of product that the apparatus, systems, and methods of the present invention can produce. For example, one or more implementations can process not only resin "panels," as such, but also glass panels. Furthermore, one will appreciate that at least one implementation can also process other types of structures having different material compositions, such as objects comprising wood, stone, fiberglass, or the like, which may or may not exhibit primarily panel-like dimensions as described herein. Such structures can include, for example, circuit boards, films, fabrics, etc. Reference herein, therefore, to panels, or even resin panels, as such, is primarily for convenience in description.

Figure 1B:
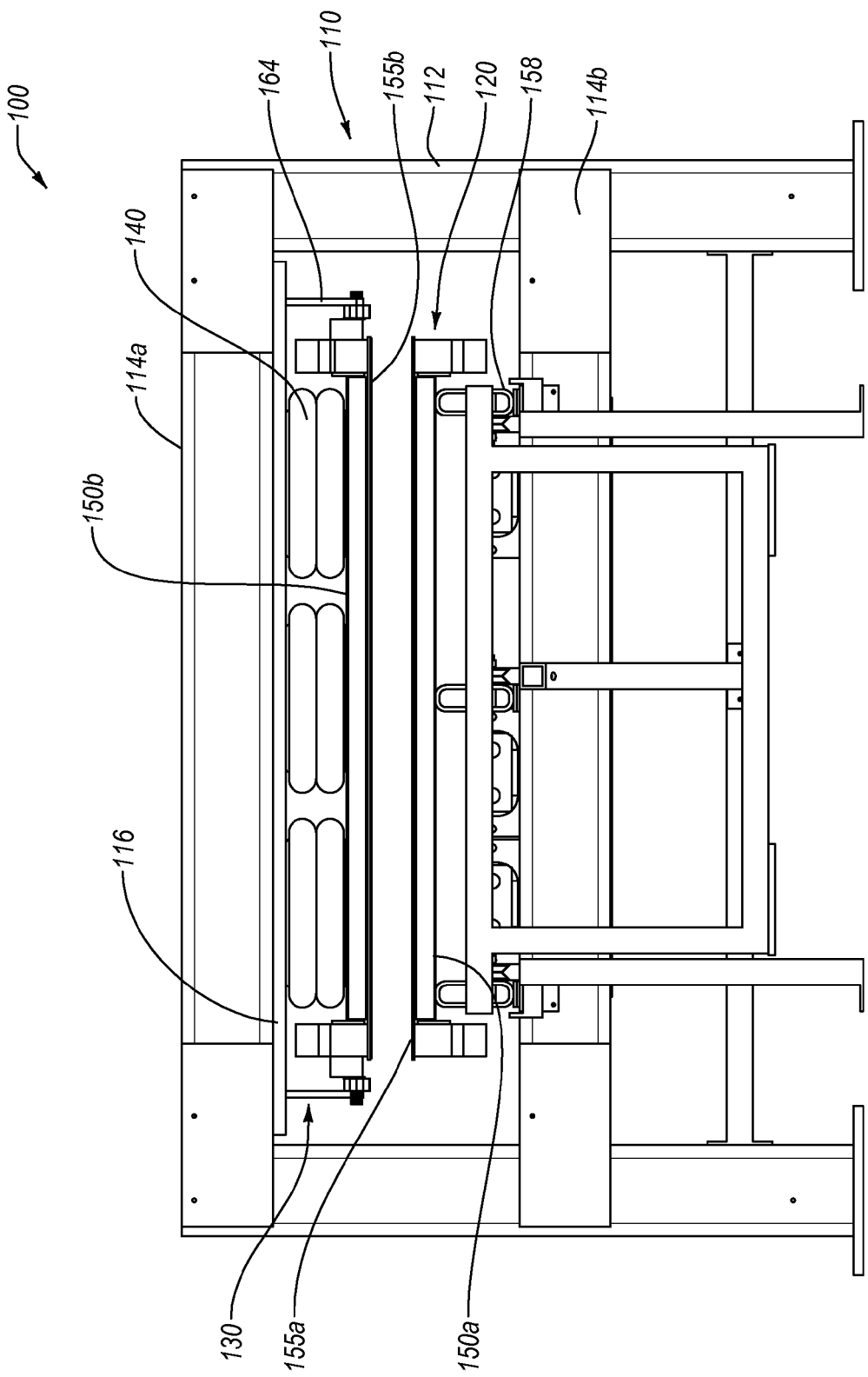
FIG. 1B illustrates a front view of the lamination press of FIG. 1A.

Accordingly, and as will be understood more fully from the following specification and claims, at least one implementation includes a lamination press configured for pressing, heating, and cooling layers of resin material. For example, FIGS. 1A-1B illustrate a perspective view of a lamination press 100 according to an implementation of the present invention. As illustrated in FIG. 1A, the lamination press 100 can include a frame 110 for supporting or mounting one or more lamination press components or elements.

Particularly, the frame 110 can include a plurality of vertical support members 112 interconnected by a plurality of horizontal support members, such as upper horizontal support members 114*a* and lower horizontal support members 114*b*. Additionally, the frame 110 can include an upper support plate 116. For instance, the upper support plate 116 can couple to one or more upper horizontal support members 114*a*. One will appreciate, however, that a specific configuration of the frame 110 can vary from one implementation to another, as may be suitable for supporting particular components or elements of the lamination press 100.

The lamination press 100 also can include a lower platen assembly 120 and an opposing upper platen assembly 130. The lower horizontal support members 114*b* can support the lower platen assembly 120. Thus, in at least one implementation the lower platen assembly 120 can remain stationary and supported by the lower horizontal support members 114*b*.

As described in more detail herein, during the closure thereof, the lamination press 100 can apply heat and pressure to a laminate assembly to form a unitary product. As used herein, the term "laminate assembly" (or "layup stack") refers to two or more layers of material that the lamination press can at least partially form together through the application of heat and pressure. For example, the laminate assembly can include a first resin sheet, a decorative image layer, and a second resin sheet. In other cases, the laminate assembly may also or alternatively comprise a substrate (e.g., a resin or glass sheet), and an adjacent decorative image layer.

Still further a laminate assembly can include a pair of substrates (e.g., a plurality of resin and/or glass sheets) with no additional image layer, or perhaps only a film layer. Additionally, the manufacturer can include one or more sheets of finishing paper (i.e., on one or both sides) in the laminate assembly. The manufacturer can position the finishing paper on outer surfaces of the laminate assembly, between the resin sheets and the platens of the lamination press. Hence, for example, the finishing paper can impart a desired pattern or texture onto the finished unitary product.

The manufacturer can place the laminate assembly into an open lamination press 100. Subsequently, the lamination press 100 can close and the lower platen assembly 120 and upper platen assembly 130 can and apply pressure to the laminate assembly when pressed together about the laminate assembly. While the upper and lower platen assemblies 120, 130 press the laminate assembly together, a heating source can heat the upper and lower platen assemblies 120, 130 and, thus, the laminate assembly. The heat and pressure from the upper and lower platen assemblies 120, 130 can cause the layers of the laminate assembly to at least partially form together. Additionally, a cooling source can then cool the upper and lower platen assemblies 120, 130 and, thus, the laminate assembly, to form a unitary product, such as a panel.

For example, the lamination press 100 can have a plurality of inflatable air springs 140 that can move the upper platen assembly 130 toward the lower platen assembly 120. Such movement of the upper and lower platen assemblies 120, 130 can press the upper platen assembly 130 together with the lower platen assembly 120 and also can press the laminate assembly therebetween. In other words, air springs 140 can move the upper platen assembly 130 toward the lower platen assembly 120 to apply pressure to the laminate assembly.

The number of air springs 140 can vary from one implementation to another and, among other things, can depend on the type and capacity of the air springs 140 utilized. For example, the lamination press 100 can include three rows of air springs 140. Additionally, each row can have six air springs 140 therein, for a total of 18 air springs 140, which may have substantially equidistant spacing therebetween.

In one implementation, the air springs 140 can reside between the upper support plate 116 and a non-working surface 150*b* of the upper platen assembly 130. When inflated, the air springs 140 can expand and press the upper platen assembly 130 away from the upper support plate 116. The upper support plate 116 and the lower platen assembly 120 can remain stationary. When the air springs 140 expand and press the upper platen assembly 130 away from the upper support plate 116, the upper platen assembly 130 can move toward and can press against the lower platen assembly 120 (i.e., into the closed position, illustrated in FIG. 1A).

As noted above, the lower platen assembly 120 can remain stationary within the lamination press 100, as the upper platen assembly 130 moves toward the lower platen assembly 120. For instance, mounting rails 158 can couple to a non-working face 150*a* of the lower platen assembly 120, thereby supporting the lower platen assembly 120 in a stationary position (FIG. 1B). Consequently, the lamination press 100 can press the laminate assembly between the upper and lower platen assemblies 120, 130, as the upper platen assembly 130 move toward the lower platen assembly 120. More specifically, the lamination assembly can lie on a lower working surface 155*a* of the lower platen assembly 120. As the upper platen assembly 130 moves toward the lower platen assembly 120, respective lower and upper working surfaces 155*a*, 155*b* of the upper and lower platen assemblies 120, 130 can press the laminate assembly.

In one or more implementations, the lower platen assembly 120 and the upper platen assembly 130 can be identical and can couple to the frame 110 in mirrored positions, opposite to one another. Furthermore, a manufacturer can selectively move the lower platen assembly 120 and/or the upper platen assembly 130 relative to the frame 110 to open the lamination press 100 (FIG. 1B) and to close the lamination press 100 (FIG. 1A). In other words, the lamination press 100 can decrease and increase the space between the lower platen assembly 120 and the upper platen assembly 130. For instance, when the lamination press 100 opens, the manufacturer can place, position, and remove the laminate assembly and the formed unitary product.

The lamination press 100 can include one or more actuators that can move the lower platen assembly 120 and/or the upper platen assembly 130 relative to each other, which can provide for the opening and closing of the lamination press 100. For example, the actuator assemblies 160 can move the upper platen assembly 130 away from the lower platen assembly 120, thereby increasing the distance between the lower and upper working surfaces 155*a*, 155*b* of the lower and the upper platen assemblies 120, 130. Each of the actuator assemblies 160 can include a lever 162 coupled to the upper horizontal support member 114*a* and a pull rod 164 coupled to the lever 162. The pull rod 164 also can couple to the upper platen assembly 130, thereby connecting the upper platen assembly 130 to the lever 162. Furthermore, such connections also can couple the upper platen assembly 130 to the upper horizontal support member 114*a* (and, thus, to the frame 110).

The actuator assemblies 160 also can include an air cylinder 166, which can move the lever 162 relative to the frame 110. Also, by coupling the upper platen assembly 130 to the lever 162, movements of the lever 162 can be transmitted to the upper platen assembly 130. Thus, the air cylinders 166 can expand and move the lever 162 and the pull rod 164 in an upward direction, thereby moving the upper platen assembly 130 away from the lower platen assembly 120 and opening the lamination press 100.

In any event, the manufacturer can operate the lamination press 100 to raise or lower the upper platen assembly 130 and/or the lower platen assembly 120 relative to each other. Furthermore, in light of this disclosure, those skilled in the art should appreciate that the lamination press 100 can include other types of actuators and configurations that can open and/or close the lamination press 100. For example, the lamination press 100 can include one or more cylinders (e.g., hydraulic or pneumatic cylinders) as well as electrical, mechanical, and electromechanical actuators that can move the upper platen assembly 130 and/or the lower platen assembly 120 toward and away from each other.

Additionally, the lower platen assembly 120 and/or the upper platen assembly 130 may be removable (e.g., slidably removable) from the lamination press 100. In at least one implementation, as further described below, the lower platen assembly 120 can slide in and out of the frame 110. For example, the lamination press 100 can include slide rails 170 that can guide the lower platen assembly 120 of the lamination press 100. Some of the horizontal support members (e.g., the lower horizontal support members 114*b*) can support the slide rails 170. Thus, the manufacturer can remove and/or replace the lower platen assembly 120 in the lamination press 100. One will appreciate that, in such implementations, the manufacturer can stagger the steps in the processing cycles, which may increase processing efficiency and reduce labor.

For instance, while the lamination press 100 is in a closed position and processing a first laminate assembly, the manufacturer can lay out a second laminate assembly on a second (i.e., replacement) lower platen assembly 120. After completing the processing of the first laminate assembly, the manufacturer can remove a first lower platen assembly 120 together with a first unitary product (formed from the first laminate assembly) from the lamination press 100 and can insert the second lower platen assembly 120 with the second laminate assembly. Furthermore, removal of the lower platen assembly 120 from the lamination press 100 also can provide the manufacturer greater access to the unitary product formed from the laminate assembly, which can reduce or eliminate incidents of damaging the unitary product due to mishandling (e.g., accidental contact with the frame 110).

In addition, the lamination press 100 can include one or more heating and cooling sources 180 for heating and cooling the lower platen assembly 120 and upper platen assembly 130. For example, as described below in further detail, the lamination press 100 can include a heating source that can pump heated medium or fluid through the lower platen assembly 120 and/or through the upper platen assembly 130. Likewise, the lamination press 100 also can include a cooling source that can pump a cooled medium through the lower platen assembly 120 and/or through the upper platen assembly 130. Accordingly, as noted above, the lamination press 100 can heat and cool the lower platen assembly 120 and the upper platen assembly 130, thereby heating the laminate assembly and, after processing, cooling the unitary product.

As previously mentioned, the lamination press 100 can apply uniform or substantially uniform pressure across a surface of the laminate assembly and can, thereby, increase processing efficiency. The lower platen assembly 120 and/or the upper platen assembly 130 can include platens that may be thin, and which can flex and/or deform about the laminate assembly. As the platens flex and/or deform about the laminate assembly, working surfaces of the platens can remain in contact with corresponding portions of the laminate assembly and can apply uniform pressure thereon.

Figure 2A:
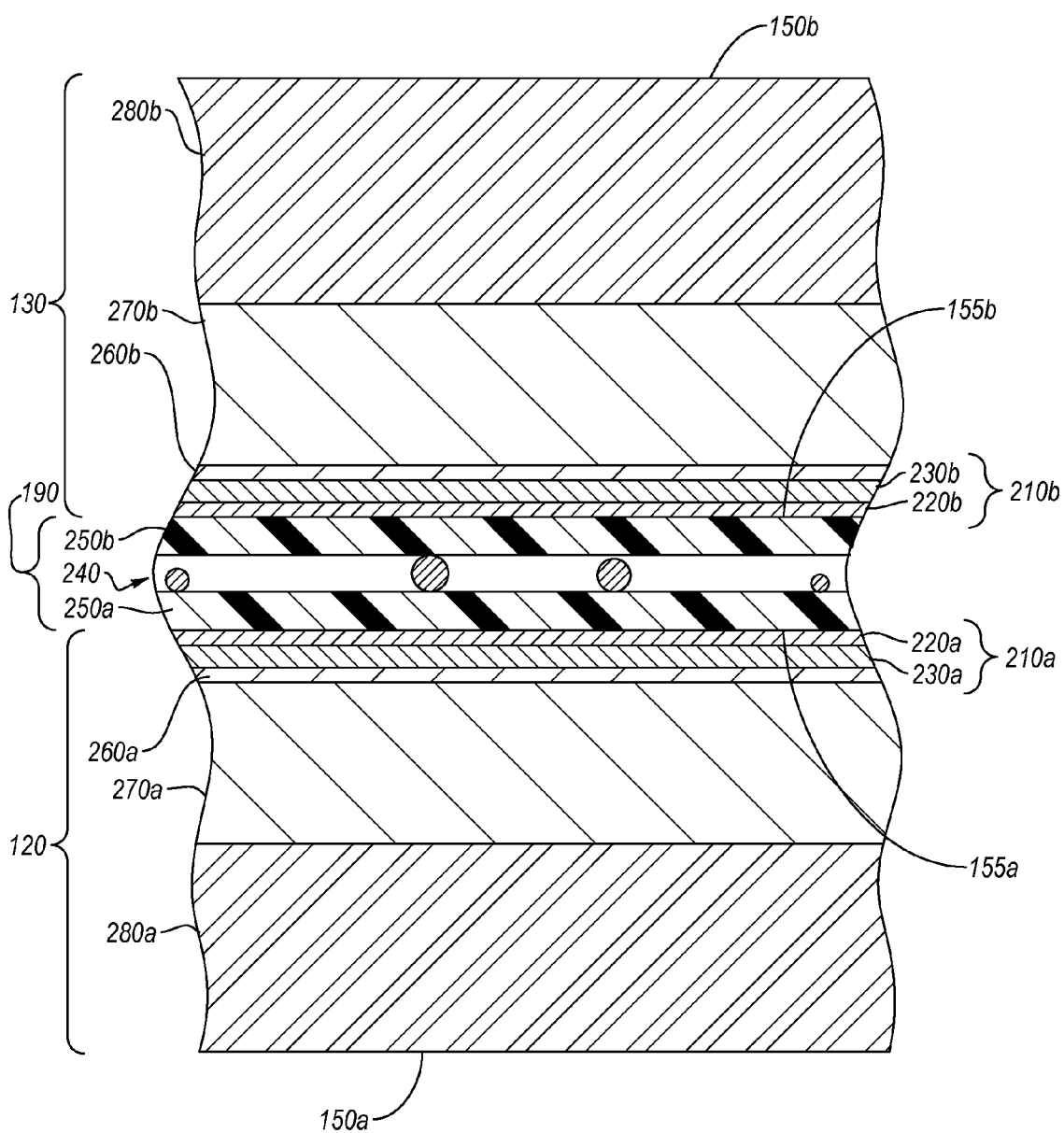
FIG. 2A illustrates a cross-sectional view of a laminate assembly positioned between an upper platen assembly and a lower platen assembly in accordance with one implementation of the present invention.
Figure 2B:
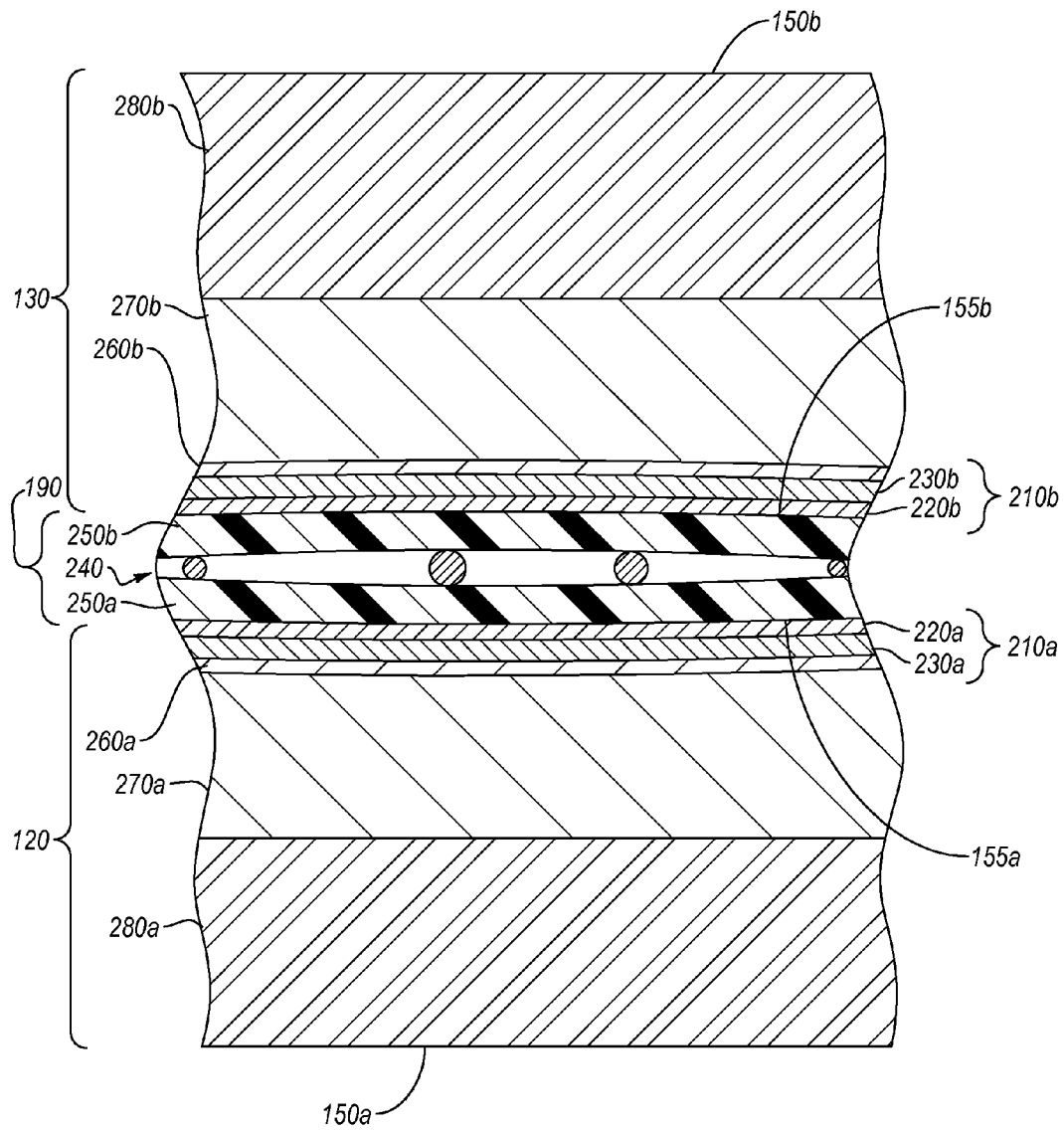
FIG. 2B illustrates a cross-sectional view of a laminate assembly positioned between a flexed upper platen assembly and a flexed lower platen assembly in accordance with one implementation of the present invention.

For example, FIGS. 2A and 2B illustrate a cross-sectional view of a laminate assembly 190 positioned between the lower upper platen assemblies 120, 130. Particularly, FIG. 2A illustrates a cross-sectional view of a laminate assembly 190 between the lower and upper platen assemblies 120, 130 before pressure is applied to the laminate assembly 190. By contrast, FIG. 2B illustrates the laminate assembly 190 as the pressure is applied thereon by the lower and upper platens 210*a*, 210*b* and as the lower and upper platens 210*a*, 210*b* flex about an image layer 240 (as further described below).

As noted above, the lower platen assembly 120 and the upper platen assembly 130 can have similar or the same configuration. In at least one implementation, the lower platen assembly 120 and the upper platen assembly 130 can include respective lower and upper working surfaces 155*a*, 155*b*, which can press against the laminate assembly 190. More specifically, the lower platen assembly 120 can incorporate a lower platen 210*a* that has the lower working surface 155*a*, and the upper platen assembly 130 can incorporate an upper platen 210*b* that has the upper working surface 155*b*.

Each of the lower and the upper platens 210*a*, 210*b* can have a first flexible plate and a second flexible plate which may be coupled together. For instance, the lower platen 210*a* can include a lower first flexible plate 220*a* (i.e., the plate that defines the lower working surface) and a lower second flexible plate 230*a*. Similarly, an upper first flexible plate 220*b* and an upper second flexible plate 230*b* can form the upper platen 210*b*.

As described above, the lower platen 210*a* and the upper platen 210*b* can be substantially flexible and/or deformable, such as to accommodate the formations and shifts of the laminate assembly 190 during processing. The ability of the lower and upper platens 210*a*, 210*b* to flex can allow the lower and upper platens 210*a*, 210*b* to adjust or compensate for the processing of some non-planar materials, such as non-planar lamination materials. In particular, the lower and upper platens 210*a*, 210*b* can flex about larger three-dimensional objects, such as the larger pieces of thatch of the image layer 240, to prevent portions of the image layer 240 from receiving a disproportionate amount of pressure. Thus, the lower and upper platens 210*a*, 210*b* can efficiently laminate three-dimensional objects between first and second resin sheets 250*a*, 250*b*. Moreover, such flexing also can reduce or eliminate most, if not all, crushing and flattening of any larger three-dimensional objects of the image layer 240 due to disparately applied forces.

Also, the flexibility of the lower and/or upper platens 210*a*, 210*b* can help eliminate or reduce air pockets and air bubbles in a resulting unitary product. In particular, the flexibility of the lower and upper platens 210*a*, 210*b* can help push or force air bubbles out from in between the layers of the laminate assembly 190 as the lower and upper platens 210*a*, 210*b* apply pressure to the laminate assembly 190. For example, by adjusting and flexing as the first and second resin sheets 250*a*, 250*b* melt and form together, the lower and upper platens 210*a*, 210*b* can help ensure that uniform or substantially uniform pressure is applied to the laminate assembly 190. By applying uniform or substantially uniform pressure across the laminate assembly 190, the lower and upper platens 210*a*, 210*b* can help reduce or prevent low pressure areas across the laminate assembly 190, such as, for example, between and about the image layer 240, where air bubbles may form.

The uniform or substantially uniform pressure across the laminate assembly 190 can also reduce or eliminate the need for additional mechanisms for aiding in distributing pressure from the lower and upper platens 210a, 210b evenly or uniformly across the outer surfaces of the laminate assembly 190. Elimination of the pressure pads, tooling plates, and similar mechanisms also can speed up the heating and cooling rates of the lower and upper platens 210a, 210b and, consequently, of the laminate assembly 190. Such increased heat transfer rates can reduce processing time, power requirements, and otherwise increase efficiency of the lamination process.

According to one or more implementations, the lower and upper platens 210a, 210b can also allow for the production of a smooth and flat final product. For example, as described above, the air springs 140 (FIGS. 1A-1B) can press the lower platen assembly 120 and the upper platen assembly 130 together, thereby pressing the laminate assembly 190. As the upper platen assembly 130 presses the laminate assembly 190 against the lower platen assembly 120, the flexible, yet rigid lower and upper platens 210a, 210b can flatten and smooth out the laminate assembly 190 to create a smooth, unitary product of substantially uniform gauge.

Additionally, flexible configuration of the lower and upper platens 210a, 210b can help reduce or eliminate permanent scratching, roughening, deformation as well as damage to the lower and upper platens 210a, 210b. For example, the lower and upper platens 210a, 210b can flex and bend about objects that may scratch or otherwise permanently deform the lower and upper platens 210a, 210b. When the lamination press opens, the lower and upper platens 210a, 210b can return to their original forms. Thus, the flexibility of the lower and upper platens 210a, 210b can increase the life span of the lower and upper platens 210a, 210b. Increasing life span of the lower and upper platens 210a, 210b, can reduce overhead costs and increase processing efficiency by reducing the need to change platens or compensate for platen damage.

In one or more implementations, the lamination press can directly heat and/or cool the lower and upper platens 210a, 210b. To allow direct heating and cooling, the lower and upper platens 210a, 210b can have an unconventional configuration (further described below), which allows the lamination press to pump heating and cooling fluid through the lower and/or upper platens 210a, 210b. Moreover, in addition to allowing the lamination press to provide direct heating and cooling to the lower and/or upper platens 210a, 210b, such configurations also can improve flexibility and/or deformability of the lower and upper platens 210a, 210b. For instance, as compared with conventional platens, the lower and upper platens 210a, 210b can heat and cool faster and can be more flexible.

The lower and/or upper platens 210a, 210b can comprise multiple sheets of material or multiple plates (i.e., the lower and upper first flexible plates 220a, 220b and lower and upper second flexible plates 230a, 230b), which may be relatively thin. Particular material and sheet thickness of the lower and upper first flexible plates 220a, 220b and lower and upper second flexible plates 230a, 230b can vary from one implementation to another. The lower and upper first flexible plates 220a, 220b and lower and upper second flexible plates 230a, 230b can comprise aluminum sheets (or similarly conductive and/or flexible metal or composite). Furthermore, the lower and upper first flexible plates 220a, 220b and lower and upper second flexible plates 230a, 230b can have thicknesses in the range between about ⅛ inch and about ½ inch. The manufacturer can select thicknesses and material types for the lower and upper first flexible plates 220a, 220b and for the lower and upper second flexible plates 230a, 230b according to a desired degree of flexibility and/or rate of heat transfer.

For instance, in at least one implementation, the lower and/or upper platens 210a, 210b can have a width and a length of approximately 55"×100", respectively. In such implementation, lower and upper first flexible plates 220a, 220b can have a thickness of about ⅛" and the lower and upper second flexible plates 230a, 230b can have a thickness of about 3/16". In light of this disclosure, those skilled in the art should appreciate that thickness of the first and second plates comprising the lower and/or upper platens 210a, 210b can vary from one implementation to another and can depend, at least in part, on particular lengths and widths of the lower and/or upper platens 210a, 210b.

Additionally, the lower first flexible plate 220a and the lower second flexible plate 230a as well as the lower first flexible plate 220b and the lower second flexible plate 230b can couple together. More specifically, the lower and upper first flexible plates 220a, 220b and lower and upper second flexible plates 230a, 230b respectively, can couple at one or more locations therebetween. Thus, the manufacturer also can adjust the flexibility and stiffness of the lower upper platens 210a, 210b by selecting the number and size of locations for coupling as well as the positions thereof.

For instance, selecting fewer coupling locations between the lower and upper first flexible plates 220a, 220b and lower and upper second flexible plates 230a, 230b can allow for greater flexibility of the lower upper platens 210a, 210b. Conversely, increasing the number of coupling locations can reduce flexibility of the lower upper platens 210a, 210b. Moreover, coupling locations along the perimeter of the lower and upper first flexible plates 220a, 220b and lower and upper second flexible plates 230a, 230b can have limited relative movement therebetween. Such movement may provide a greater degree of flexibility to the lower platen 210a and the upper platen 210b, as compared with lower platen 210a and the upper platen 210b that have lower and upper first flexible plates 220a, 220b and lower and upper second flexible plates 230a, 230b coupled at interior locations thereof.

Additionally, the lower platen assembly 120 and the upper platen assembly 130 can include respective insulation layers 260a and 260b. The insulation layers 260a and the 260b can abut the lower and upper platens 210a, 210b (on a non-working surface thereof) and can prevent unwanted transfer of heat from and to the lower and upper platens 210a, 210b. For example, when the lamination press heats the lower and upper platens 210a, 210b, it can be advantageous for processing the laminate assembly 190 to prevent heat transfer from the lower and upper platens 210a, 210b to other components of the lamination press (i.e., minimizing time required to heat the laminate assembly 190). Similarly, when the lamination press cools the lower and upper platens 210a, 210b it may be advantageous to prevent heat transfer to the lower and upper platens 210a, 210b, other than from the unitary product formed from the laminate assembly 190.

Thus, insulation layers 260a, 260b can increase heating and cooling (i.e., thermal) efficiency of the lamination press, by preventing unwanted heat transfer from and to the lower and upper platens 210a, 210b. In addition to decreased processing time, such increase in thermal efficiency of the lamination press 100 also can reduce processing cost and can lead to overall manufacturing cost reduction. Furthermore, in one or more implementations, the insulation layers 260a, 260b can comprise flexible and/or deformable material.

Accordingly, in addition to increasing thermal efficiency of the lamination press 100, the insulation layers 260a, 260b also can provide additional flexibility to the lower and upper platens 210a, 210b. Particularly, the insulation layers 260a, 260b can compress and/or deform in response to pressure from the lower and upper platens 210a, 210b, respectively. Such flexing and/or deformation of the 260a, 260b can, in turn, can allow the lower and upper platens 210a, 210b to flex and deform, as described above. For instance, in at least one implementation, the insulation layers 260a, 260b can have a thickness of approximately ¼". Moreover, the insulation layers 260a, 260b may be compressible (e.g., by a certain percentage, such as 30%). Hence, the insulation layers 260a, 260b can allow the lower and upper platens 210a, 210b to flex in a range of the compressibility percentage of the thickness of the insulation layers 260a, 260b. The insulation layers 260a, 260b can comprise NOMAX felt, aromatic polyamide, mineral fiber board, or other materials with suitable properties.

In one or more implementations, the lower platen assembly 120 and upper platen assembly 130 also can incorporate flexible pads 270a, 270b. The flexible pads 270a, 270b can provide further flexibility to the lower platen assembly 120 and upper platen assembly 130. For instance, the flexible pads 270a, 270b can comprise a flexible and/or deformable material, such as silicone. Hence, the flexible pads 270a, 270b can be more flexible and/or more deformable than the insulation layers 260a, 260b. Moreover, the flexible pads 270a, 270b can provide additional flexibility and deformability to the lower and upper platen assemblies 120, 130.

The flexible pads 270a, 270b also can be thicker than the insulation layers 260a, 260b. For example, the flexible pads 270a, 270b can be approximately ½" thick. The thicker the flexible pads 270a, 270b, the more deformation of the lower and upper platens 210a, 210b the respective flexible pads 270a, 270b can allow. In other words, the thicker the flexible pads 270a, 270b the more the flexible pads 270a, 270b can compress in response to pressure. It should be noted that thickness as well as flexibility and/or deformability of the flexible pads 270a, 270b can vary from one implementation to another. The manufacturer also can select a particular thickness and/or flexibility or deformability of the flexible pads 270a, 270b that may achieve a desired flexibility or deformability of the lower and upper platen assemblies 120, 130.

In at least one implementation, the flexible pads 270a, 270b can abut the insulation layers 260a, 260b, respectively. Additionally, the lower platen assembly 120 and the upper platen assembly 130 can include pressure plates 280a, 280b. Hence, the flexible pads 270a, 270b also can abut (on an opposite side) pressure plates 280a, 280b.

In one or more implementations, the pressure plates 280a, 280b can be substantially rigid and non-flexible. In other words, the pressure plates 280a, 280b can comprise thick steel plates (e.g., ¾", 1", 1.5", 2", etc.). Preferably thickness of the pressure plates 280a, 280b can depend on the respective widths and lengths thereof. Particularly, the manufacturer can select plate thickness based on the desired rigidity and length and widths of the pressure plates 280a, 280b.

The pressure plates 280a, 280b also can form or define the non-working surfaces 150a, 150b, respectively. Accordingly, the pressure plates 280a, 280b can transfer pressure to abutting layers of the lower and upper platen assemblies 120, 130. More specifically, the pressure plates 280a, 280b can transfer pressure and/or movement to the lower and upper platens 210a, 210b. Providing the flexible pads 270a, 270a between the substantially rigid pressure plates 280a, 280b can allow the lower and upper platens 210a, 210b to flex and/or deform relative to the respective pressure plates 280a, 280b.

As described above, to form a unitary product, the manufacturer can first position the laminate assembly 190 inside the lamination press. In one implementation, as a preliminary step in forming a unitary product, the manufacturer can place the laminate assembly 190 on the lower working surface 155a. For example, the manufacturer can place the first resin sheet 250a on the lower working surface 155a, the image layer 240 on the first resin sheet 250a, and the second resin sheet 250b on the image layer 240 to form the laminate assembly 190. As mentioned previously, the laminate assembly 190 can incorporate an image layer 240 that comprises fabrics, paper, colored films, printed images, three-dimensional objects, and combinations thereof. For example, FIG. 2A illustrates the image layer 240 that comprises a layer of thatch reed.

After having positioned or formed the laminate assembly 190 on the lower working surface 155a, the manufacturer can close the lamination press over the laminate assembly 190. As described above, actuators, such as the air springs, can move the upper platen assembly 130 toward the lower platen assembly 120, thereby closing the lamination press. For example, FIG. 2A, illustrated the lamination press in the closed position with the laminate assembly 190 pressed between the lower and upper platen assemblies 120, 130.

According to another implementation, the lamination press can heat and press the laminate assembly 190 to form a unitary product having a smaller gauge or overall thickness than the laminate assembly 190 (prior to processing). As the lower and the upper platen assemblies 120, 130 press and heat the laminate assembly 190, the first and second resin sheets 250a, 250b can at least partially melt and flow around the image layer 240, thereby, forming the unitary product. More specifically, heat can transfer from the lower working surface 155a to the first resin sheet 250a and from the upper working surface 155b to the second resin sheet 250b, thereby at least partially melting the first and second resin sheets 250a, 250b. Thus, the unitary product can form as the resin sheets 250a 250b, at least partially melt, and as the lower platen assembly 120 and upper platen assembly 130 press the at least partially melted resin sheets 250a, 250b about the image layer 240.

FIG. 2B illustrates a unitary product 290 that can form from pressing together and at least partially melting the first and second resin sheets about the image layer. As described above, the lamination press can directly heat and cool the lower and upper platens 210a, 210b. Accordingly, after heating, melting, and pressing together, the resin sheets form the unitary product 290. Thereafter, the lamination press can complete processing by cooling the unitary product 290 below glass transition temperature (e.g., to room temperature). By cooling the unitary product 290 below the glass transition temperature, the manufacturer can prevent deformation of the unitary product 290, which may occur at temperatures above the glass transition temperature.

As further described below, the lamination press can supply cooling medium directly into the lower and upper platens 210a, 210b, thereby cooling the lower and upper platens 210a, 210b. Additionally, after forming the unitary product 290, the lower and upper working surfaces 155a, 155b can remain in contact with respective portions of the unitary product 290. Accordingly, heat from the unitary product 290 can transfer to the cooled lower and upper platens 210a, 210b through the lower and upper working surfaces 155a, 155b.

Namely, as the lower and upper platens 210a, 210b cool below the temperature of the unitary product 290, the heat from the unitary product 290 can begin to transfer to the lower and upper platens 210a, 210b. Furthermore, as the cooling medium passes through the lower and upper platens 210a, 210b, the cooling medium can cool the lower and upper platens 210a, 210b, thereby maintaining a temperature gradient between the lower and upper platens 210a, 210b and the unitary product 290. A sufficient temperature gradient between the lower and upper platens 210a, 210b and the unitary product 290 can facilitate the heat transfer from the unitary product 290 to the lower and upper platens 210a, 210b.

Additionally, as described above, the lower and upper platens 210a, 210b can comprise thermally conductive material (e.g., aluminum, copper, brass, bronze, etc.). As the mass of the lower and upper platens 210a, 210b can be lower than the mass of comparable conventional platens, the cooling medium can cool down the lower and upper platens 210a, 210b faster than the comparable conventional platens. Thus, as the lower and upper platens 210a, 210b cool down faster, so can the unitary product 290. Accordingly, the lamination press can reduce processing time by decreasing the amount of time required to cool down the unitary product 290 below the glass transition temperature, as compared with conventional lamination presses and platens.

As described above, to heat and/or cool the lower and upper platens 210a, 210b, the lamination press can force heated or cooled medium through the lower and upper platens 210a, 210b. In one or more implementations, the first and/or second flexible plates of the lower and upper platens 210a, 210b can have multiple grooves that can constrain and guide flow of such heating and/or cooling medium across the lower and upper platens 210a, 210b. FIG. 3 illustrates one exemplary implementation of one or more of the plates comprising the lower and/or upper platens 210a, 210b.

In at least one implementation, the second flexible plate of the lower platen 210a can be substantially the same as the second flexible plate of the upper platen 210b. Also, the second flexible plate can be substantially the same as the first flexible plate of the lower and/or upper platens 210a, 210b. In other words, any one of the first and second flexible plates of the lower and upper platens 210a, 210b can have the configuration illustrated in FIG. 3A. Also, any one of the first and second flexible plates of the lower and upper platens 210a, 210b can be substantially uniform (i.e., a flat plate, without grooves).

That is, either the first, the second, or both plates of the lower and upper platens 210a, 210b can have grooves that can facilitate flow of heating and/or cooling medium. Moreover, one of such plates can couple to an opposing plate that either has grooves or is uniform. For example, as illustrated in FIG. 3B, a first flexible plate 220 can be uniform, while a second flexible plate 230 have grooves can, or the reverse. Alternatively, as illustrated in FIG. 3C, both the first and the second flexible plates 220, 230 can have grooves. As the implementation illustrated in FIG. 3A can apply equally to any one of the plates comprising the lower and upper platens 210a, 210b, for ease of reference, the plate illustrated therein will be referred to as a grooved plate 220.

Figure 3A:
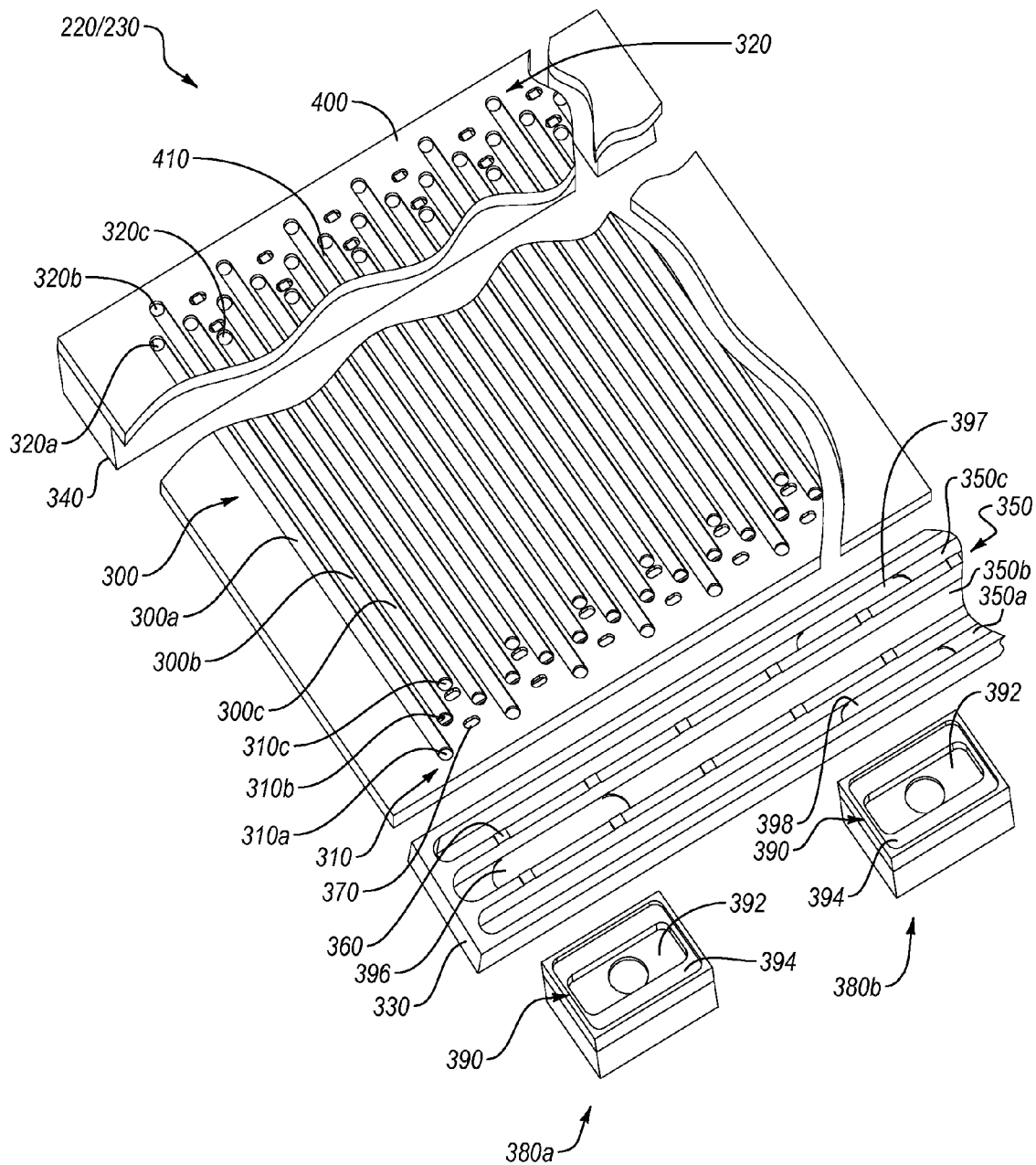
FIG. 3A illustrates a perspective view of a grooved plate, a manifold, and connector blocks that comprise a lower platen assembly and/or an upper platen assembly in accordance with one or more implementations of the present inventions.
Figure 3B:
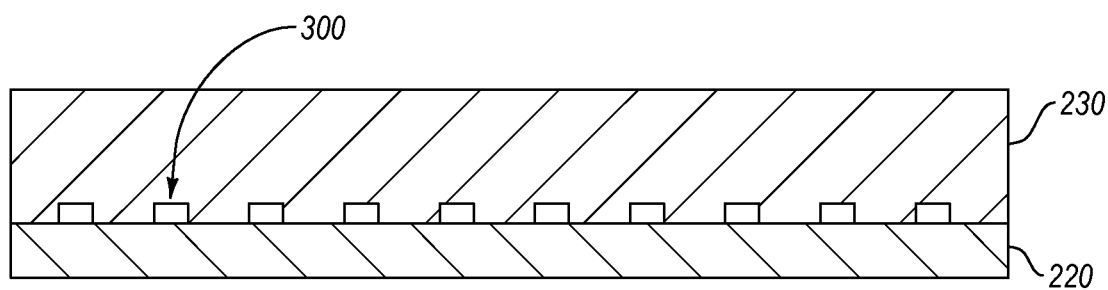
FIG. 3B illustrates a cross-sectional view of a platen assembly in accordance with one implementation of the present invention.
Figure 3C:
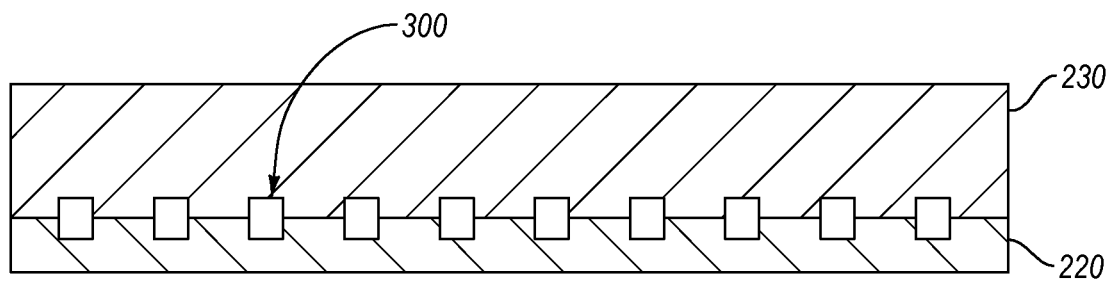
FIG. 3C a cross-sectional view of a platen assembly in accordance with another implementation of the present invention.

Referring now to FIG. 3A, the grooved plate 220 can have multiple grooves that can allow heating and/or cooling medium to flow across the platen. Particularly, the grooved plate 220 can have grooves 300, which may be substantially straight. Furthermore, the grooves 300 can span substantially across an entire length or width of the grooved plate 220. Each of the grooves 300 also can connect to first side openings 310 at a first end thereof and to second side openings 320 at a second, opposing end thereof.

In at least one implementation, the first side openings 310 can pass through the grooved plate 220. Similarly, the second side openings 320 also can pass through the grooved plate 220. Consequently, heating and/or cooling medium can enter the grooves 300 from the side of the grooved plate 220 that is opposite to the grooved side. As further described below, a first manifold 330 can couple to the grooved plate 220 and can supply the heating and/or cooling medium from the heating or cooling sources, through the first side openings 310, into the grooves 300. Likewise, a second manifold 340 can return the heating and/or cooling medium back to the respective heating and cooling sources.

It should be noted that the designations first and second, as they relate to the manifolds first and second manifolds 330, 340 are arbitrary and have been made for the purposes of description. Moreover, the first and second manifolds 330, 340 can be substantially the same, and the first and/or the second manifold 330, 340 can serve as inlet and/or outlet manifolds that can channel the heating or cooling medium to/from the heating and cooling sources. Additionally, as further described below, a portion of either the first and/or the second manifold 330, 340 can channel the heating/cooling medium to the grooved plate 220, while another portion of the first and/or the second manifolds 330, 340 can channel the heating/cooling medium from the grooved plate 220 back to the heating and cooling sources.

Particularly, the first manifold 330 can have one or more channels 350 that can connect to the first side openings 310. The second side openings 320 can connect to similar channels in the second manifold 340. To align the channels 350 with the first side openings 310, the grooved plate 220 and the first manifold 330 can have corresponding alignment features.

For example, the first manifold 330 can have one or more protrusions 360 that can correspond with alignment openings 370 in the grooved plate 220. The protrusions 360 and the alignment openings 370 can have an appropriate clearance therebetween (e.g., 0.005" per side), such as to allow sufficiently accurate alignment between the grooved plate 220 and the first manifold 330. Thus, the protrusions 360 can enter the alignment openings 370, thereby aligning the first manifold 330 to the grooved plate 220.

The second manifold 340 also can align with the grooved plate 220 in a similar manner. In light of this disclosure, those skilled in the art should appreciate that the first and second manifolds 330, 340 and the grooved plate 220 can have any number of alignment features, such as the protrusions 360 and alignment openings 370. Furthermore, particular alignment features can vary from one implementation to another. Hence, the grooved plate 220 and the first and second manifolds 330, 340 can have alignment features of different shapes and/or sizes, and which can be integrated into the grooved plate 220 and/or into the first and/or second manifolds 330, 340 or maybe separate therefrom. For example, one or more dowel pins can align first and/or second manifolds 330, 340 and the grooved plate 220.

The cooling and/or heating sources can connect to the first manifold 330 through one or more connector blocks, such as connector blocks 380a, 380b. For instance, the connector blocks 380a, 380b can connect to the heating and cooling sources with one or more pipes or other similar tubular connectors. Likewise, the second manifold 340 also can connect to one or more connector blocks (similar to the connector blocks 380a, 380b), which can connect to the heating and cooling sources.

In at least one implementation, the first manifold 330 can have multiple channels 350 or sets of channels 350, such as sets of channel sets 350a, 350b, 350c. Such sets of channels 350 can connect to the corresponding sets of grooves 300, namely to groove sets 300a, 300b, 300c. In other words, the channels 350a can supply heating or cooling medium through first side openings 310a, and into the groove grooves 300a. Similarly, channels 350b, 350c can supply heating or cooling medium through corresponding first side openings 310b, 310c and into the respective grooves 300b, grooves 300c. Similarly, the heating or cooling medium that passes through the grooves 300a, 300b, 300c can exit through corresponding second side openings 320a, 320b, 320c. Moreover, similar to the first side openings 310a, 310b, 310c, the second side openings 320a, 320b, 320c can connect to corresponding channels in the second manifold 340.

As described above, the connector blocks 380a, 380b can connect heating and cooling sources to the first manifold 330 and particularly to the channels 350. Thus, the heating or cooling medium can flow from the heating and cooling sources, through the connector blocks 380a, 380b and into the channels 350. The connector blocks 380a, 380b can have an entrance port that can except flow from the heating and cooling sources, and one or more exit ports 390 that can connect to the channels 350.

For instance, exit ports 390 of the connector blocks 380a, 380b can have multiple connection levels, such as a first connection level 392 and a second connection level 394. In one implementation, each of the channels 350a, 350b, 350c can connect to the exit ports 390. Furthermore, different connection levels, such as the first and second connection levels 392, 394, can allow the heating or cooling medium to flow from the connector blocks 380a, 380b, through a connection level, into a channel connector, and into a particular channel 350.

For example, connection blocks 380a can couple to the first manifold 330 at a location of a first channel connector 396 in the second channel 350b. Consequently, the heating or cooling medium can flow through the connection block 380a, through the exit port 390 (e.g., through a first connection level 392), into the first channel connector 396 and into the second channel 350b. As noted above, the second channel 350b can connect to the second set of grooves 310b, such that the heating or cooling medium can flow from the second channel 350b and into the second set of grooves 310b.

The first and second connector blocks 380a, 380b can be substantially the same. In one or more implementations, however, the second connector block 380b can couple to the first manifold 330 at a location of second and third channel connectors 397, 398, which may connect to the first and/or second channels 350a, 350c. Consequently, the heating or cooling medium can flow through the second connector block 380b and into the first and second grooves 300a, 300c. More specifically, the heating or cooling medium and can flow into the second level 394 of the exit port 390, into the second and third channel connectors 397, 398, and into the first and second channels 350a, 350c.

Accordingly, the connector blocks, such as connector blocks 380a, 380b, can connect flow from the heating and/or cooling sources to particular channels 350 of the first manifold 330. Furthermore, flow also can proceed from the particular channels 350 to particular grooves 300, which correspond with such channels 350. A particular arrangement of the connector blocks, channels 350, and/or groups grooves 300 on the grooved plate 220 can vary from one implementation to another. In any event, however, the manufacturer can arrange the flow from the heating and cooling sources on the grooved plate 220 as desired.

For example, the manufacturer can concentrate the flow at one portion of the grooved plate 220, thereby creating a temperature gradient or differential across the grooved plate 220 (i.e., the grooved plate 220 being hotter at some locations than others). Alternatively, the manufacturer can provide a substantially even distribution of the flow of heating or cooling medium, thereby creating a substantially evenly heated or cooled grooved plate 220. In light of this disclosure, those skilled in the art should appreciate that the manufacturer can achieve various temperature distributions across the grooved plate 220. Such temperature distributions may at least in part depend on the particular application as well as materials used in the laminate assembly.

Furthermore, to increase the speed of cooling and/or heating of the platens, the lamination press can pass the cooling/heating medium in both directions across the platens grooves 300. For example, the cooling/heating source can pump the cooling/heating medium through one half of the grooves 300 (e.g., through the second set of grooves 300b) in a first direction, and can pump a cooling/heating medium through the other half of the grooves 300 (e.g., through the first and/or third set of grooves 300a, 350c) in a second opposing direction. Such cross flow of the cooling/heating medium can increase the cooling/heating of the platens. Furthermore, the cross flow of cooling/heating medium can help prevent one side or area of the platens from cooling or heating quicker than the other. In other words, the lamination press can cool/heat the platens and the laminate assembly from the outside in.

In the implementations of the present invention in which the lamination press uses all of the grooves 300 to cool the grooved plate 220, or even in the other implementations described herein, the cooling source can circulate cold water or oil to cool the grooved plate 220 and, thus, the platens. Additionally, to speed up the heating process after a cooling cycle, the lamination press 100 can pass air through the grooves 300 to purge any water or vapor therefrom. The purging of any water or vapor from the grooves 300 can speed up the subsequent heating of the grooved plate 220, by eliminating the need to boil the water or vapor from the grooves 300. Additionally, purging the grooves 300 with air can keep the grooves 300 clean and can prevent buildup of residue in the grooves 300.

In addition to supplying heating and/or cooling medium to the grooved plate 220, the grooves 300 can increase the flexibility of the grooved plate 220 as well as of the platens. Particularly, the grooves 300 thin out portions of the grooved plate 220 thereby making the grooved plate 220 more flexible. Furthermore, the grooves 300 can be separated by ribs 400, which can form therebetween. Thus, the grooved plate 220 and, consequently, the platen that incorporates one or more grooved plates 220 can flex about the ribs 400. To form the grooves 300, the manufacturer can mill or broach the grooves 300 in a first surface 410 of the grooved plate 220.

The closer the grooves 300 are one to another, the thinner are the ribs 400. Conversely, the farther away from one another are the grooves 300, the thicker are the ribs 400. Accordingly, the manufacturer can choose the desired number of grooves 300, the width and length of each of the grooves 300 as well as the spacing, based on particular requirements of the application (i.e., of the lamination process). More specifically, by choosing the width, length, and spacing of the grooves 300 (and thereby also controlling the width, length, and spacing of the ribs 400), the manufacturer can control the rate of heating and cooling of the platens as well as the flexibility thereof.

As described above, the platens can incorporate the first and second flexible plates, one or both of which may have grooves. Furthermore, at least one of the first and second flexible plates of the platen also has a working surface that comes into contact with and presses the laminate assembly. In one or more implementations, the working surface can be substantially flat and uniform (i.e., without grooves).

Moreover, an opposing plate (i.e., the first or the second flexible plate, as applicable) can couple to the grooved plate 220 to form the platen. Such opposing plate can close the grooves 300, thereby preventing the heating/cooling medium from leaking out therefrom. Particularly, the opposing plate can couple about the perimeter of the grooved plate 220. It should be noted that, as described above, the opposing plate can be substantially uniform (i.e., without groove) or can have grooves. In other words, a first grooved plate 220 can be the opposing plate for a second grooved plate 220.

Thus, a center portion of the grooved plate 220 can remain uncoupled from the opposing plate. As such, the heating/cooling medium may flow and mix across the grooves 300. Also, by having the opposing plate uncoupled from the ribs 400, the platen may be more flexible than a comparable platen that has the opposing plate coupled to the ribs 400. Furthermore, such platen also may be more flexible than a platen formed from a single plate that has multiple channels therein (e.g., drilled channels).

For instance, machining or otherwise forming channels for direct heating and/or cooling (e.g., for heating/cooling medium) in platens of comparable thickness may be expensive or impossible. Accordingly, incorporating one or more grooved plates 220 into the platen can allow manufacturing of the platen. Moreover, the manufacturer can directly heat and/or cool such platen. Moreover, as the center portions of the first and second flexible plates can flex and move relative to each other, such platen can have greater flexibility than a platen comprising a single plate. Consequently, the manufacturer can reduce heating and cooling time of the platens and can increase the flexibility thereof.

As noted above, in at least one implementation, the grooved plate 220 can comprise aluminum. Hence, the manufacturer can weld (e.g., TIG, MIG, resistance weld) the grooved plate 220 and the opposing plate together. For instance, the manufacturer can weld the opposing plate around the perimeter of the grooved plate 220. Additionally or alternatively, the manufacturer can use mechanical connections, such as fasteners, to couple the opposing plate and the grooved plate 220. Furthermore, to the extent that the manufacturer can choose to couple the opposing plate and the grooved plate 220 with mechanical connectors, the manufacturer also can incorporate a seal or a gasket between the grooved plate 220 and the opposing plate.

Figure 4A:
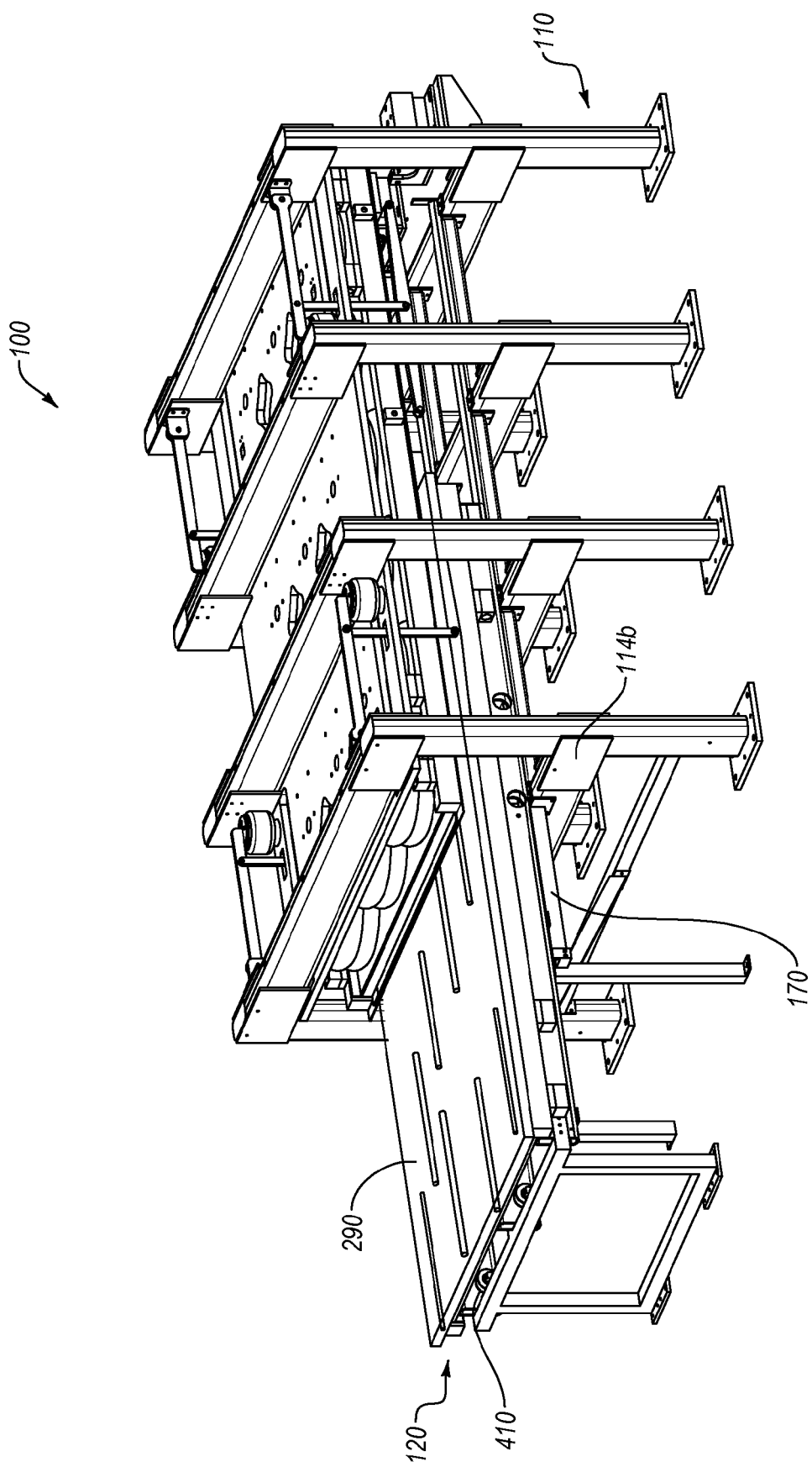
FIG. 4A illustrates a perspective view of a lamination press with a lower platen assembly partially moved out of the lamination press in accordance with one implementation of the present invention.

As mentioned above, after the lamination press has process the lamination assembly and formed the uniform product, the lamination press can open to allow the manufacturer to extract the uniform product therefrom. Additionally, as illustrated in FIG. 4A, in one or more implementations, the lower platen assembly 120 can slide out of the lamination press 100, to allow the manufacturer to remove the unitary product 290 without obstructions. For instance, the lamination press 100 can have one or more slide rails 170 that can support the lower platen assembly 120, and which can guide the lower platen assembly 120 out of the lamination press 100. In turn, the lower horizontal support members 114*b* of the frame 110 can support the slide rails 170.

Figure 4B:
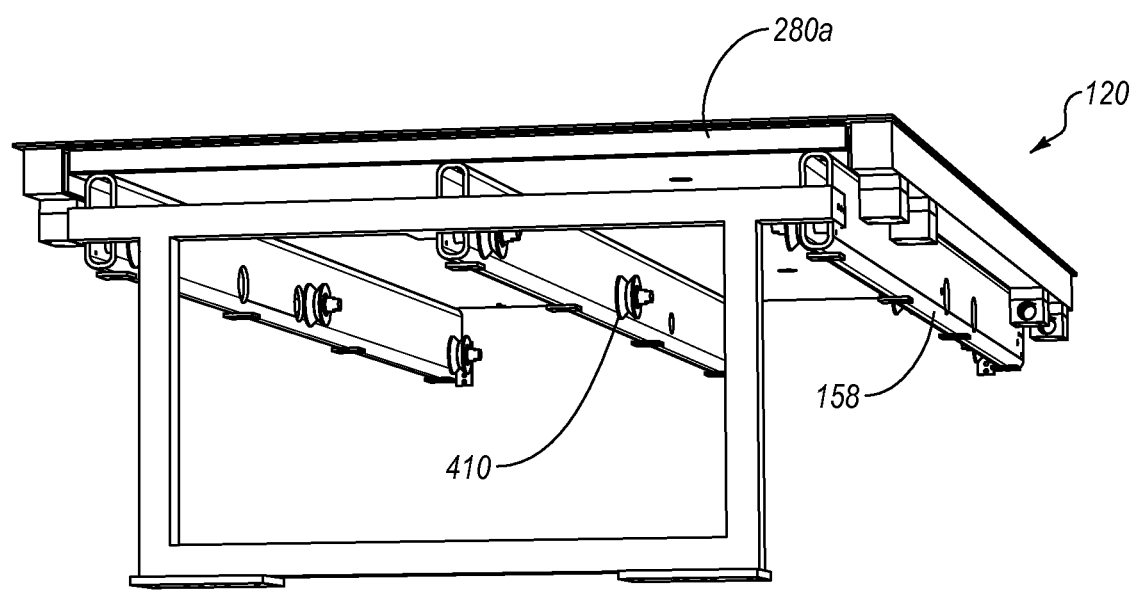
FIG. 4B illustrates a perspective view of an underside of a lower platen assembly of the lamination press of FIG. 4A.

The lower platen assembly 120 also can include rollers 410 that can roll on the slide rails 170, thereby guiding the lower platen assembly 120 over the slide rails 170 out of the lamination press 100. For example, as illustrated in FIG. 4B, the lower platen assembly 120 can incorporate mounting rails 158, which can couple to the pressure plate 280*a* of the lower platen assembly 120. The mounting rails 158 can rotatably secure the rollers 410. Thus, the lower platen assembly 120 can slide out of the lamination press 100 on the rollers 410. Additionally, the mounting rails 158 can provide further rigidity to the pressure plate 280*a*, which can prevent or reduce deformation of the pressure 280*a* under load.

As described above, while the lamination press processes a first lamination assembly, to form a first uniform product, the manufacturer can layout and prepare a second lamination assembly on a second lower platen assembly 120. Accordingly, after processing the first lamination assembly and forming the first uniform product, a first lower platen assembly 120 (holding the first uniform product) can slide out of the lamination press. Subsequently, the second lower platen assembly 120 (holding the second lamination assembly) can slide into the lamination press, and the process can commence once again. Consequently, manufacturer's ability to slide the lower platen assembly 120 in and out of the lamination press can improve production efficiency by allowing the manufacturer to layout the second lamination assembly while the lamination press processes the first lamination assembly into the first uniform product.

Figure 5:
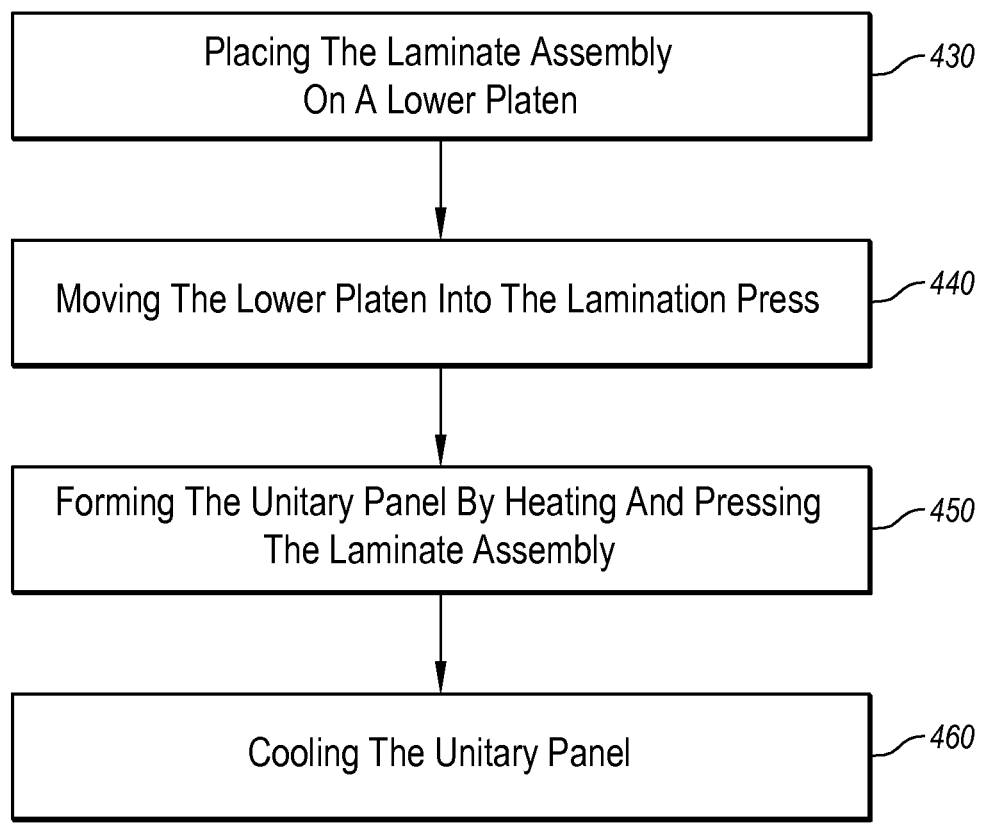
FIG. 5 illustrates a flowchart of a series of acts in a method of forming a unitary product by applying heat and pressure in accordance with one implementation of the present invention.

Accordingly, FIGS. 1-4B, and the corresponding text, provide a number of different components and mechanisms for forming a structurally sound resin panel in a rapid and efficient manner. In addition to the foregoing, implementations of the present invention can also be described in terms one or more acts in a method for accomplishing a particular result. Particularly, FIG. 5 illustrates a method of forming a unitary product by applying heat and pressure to the laminate assembly. The acts of FIG. 5 are described below with reference to the components and diagrams of FIGS. 1 through 4B.

For example, FIG. 5 shows the method can include an act 430 of placing the laminate assembly 190 on the lower platen 210*a*. For example, the manufacturer can place the first resin sheet 250*a* onto the working face of the lower platen 210*a*. Subsequently, the manufacturer can layout the image layer 240 on the first resin sheet 250*a* and place the second resin sheet 250*b* onto the image layer 240. Alternatively, the manufacturer can prepare the laminate assembly 190 and place the entire laminate assembly 190 onto the lower platen 210*a*.

Furthermore, in one or more implementations, the lower platen 210*a* (which may comprise the lower platen assembly 120) can at least partially reside outside of the lamination press 100 during the act 430. Thus, as noted above, the manufacturer can have unobstructed access to the lower platen 210*a*. In one or more implementations, the method also can optionally include an act 440 of moving the lower platen 210*a* into the lamination press 100. Particularly, the manufacturer can slide the lower platen assembly 120 (as described above) into the lamination press 100, such that the lower platen 210*a* aligns with the upper platen 210*b*. In other words, the manufacturer can place the lower platen 210*a* in a processing position that allows the lamination press 100 to close and begin processing the lamination assembly 190 into the unitary product 290.

The method also can include an act 450 of forming the unitary product 290, such as a panel, by heating and pressing the laminate assembly 190. More specifically, the manufacturer can press the laminate assembly 190 between the lower and upper platens 210*a*, 210*b*. For example, air springs 140 can expand, thereby moving the upper platen assembly 130 toward the lower platen assembly 120 and compressing the laminate assembly 190 between the lower and upper platens 210*a*, 210*b*. Hence, by adjusting the pressure in the air springs 140, the manufacturer can control the amount of pressure applied by the lamination press 100 on the laminate assembly 190.

Furthermore, the manufacturer can press the laminate assembly 190 in a manner that allows the lower platen 210a and/or the upper platen 210b to flex about the laminate assembly 190. Namely, while pressing on the laminate assembly 190, the lower and upper platens 210a, 210b can flex, deform, and/or pivot relative to each other and relative to the image layer 240 and/or relative to the surfaces of the laminate assembly 190. Such flexing of the lower and/or upper platens 210a, 210b about the lamination assembly 190 can provide uniform pressure on one or more surfaces of the lamination assembly 190. In other words, the lower and/or upper platens 210a, 210b can at least partially conform to the shape of the laminate assembly 190, as the lower and upper platens 210a, 210b compress the laminate assembly 190. Consequently, when at least partially conformed about the laminate assembly 190, the lower and upper platens 210a, 210b can provide substantially uniform pressure thereon.

Additionally, as described above, to heat the laminate assembly 190, the manufacturer can heat the lower and/or upper platens 210a, 210b, which can then transfer the heat to the laminate assembly 190. Particularly, the manufacturer can provide heated medium within the plurality of grooves 300 located in the flexible plates 220/230 that comprise the lower and/or upper platens 210a, 210b. In at least one implementation, the heated medium can flow in opposite directions across the lower and/or upper platens 210a, 210b.

By heating and pressing the laminate assembly 190, the resin sheets 250a, 250b can at least partially melt about the image layer 240 and can laminate together, forming the unitary product 290. Thereafter, the manufacturer can cool the unitary product 290 (e.g., below glass transition temperature) in an act 460. For instance, the manufacturer can cool the lower and/or upper platens 210a, 210b, which can remain in contact with the unitary product 290 and can transfer heat therefrom. Similar to the heating of the lower and upper platens 210a, 210b, the method also can include cooling the lower and/or upper platens 210a, 210b by providing cooled medium within the plurality of grooves 300 in the flexible plates 220/230 that comprise the lower and/or upper platens 210a, 210b. After the unitary product 290 cools to a desired temperature (e.g., room temperature), the manufacturer can remove the unitary product 290 from the lamination press 100.

Accordingly, the schematics and methods described herein can provide a number of ways for creating aesthetically pleasing, decorative, architecturally-suitable resin-based panels. As discussed herein, these resin panels can be substantially translucent or transparent in order to provide a desired aesthetic. Furthermore, the implementations of the present invention provide methods of creating decorative, architecturally-suitable resin-based panels without damaging the panels during processing.

In particular, implementations of the present invention can create structurally useful panels with excellent aesthetic characteristics, which have no bowing, warping, or edge rollover, since they are created in a manner that avoids non-uniform temperature and pressure gradients. This can be accomplished by applying heat and pressure uniformly and simultaneously to opposing sides of a laminate assembly, and ensuring that each surface has equal exposure to any heat sources.

Furthermore, one or more implementations of the present invention can greatly increase the processing speed and efficiency of forming resin panels. For example, the processing time of a ¼ inch resin panel using a conventional lamination press can include about 20 minutes of heating and pressing, about two minutes for transferring the laminate assembly from a hot press to a cold press, and about 20 additional minutes of cooling and pressing for a total processing time of over 40 minutes. In contrast, the processing time of a ¼ inch resin panel according to one or more implementations of the present invention can include about 8 minutes or less of heating and pressing, and about 2 minutes or less of cooling for a total processing time of about 10 minutes. Thus, in at least one implementation, the present invention can reduce the processing time of a resin panel to ¼th that of many conventional processes.

Notably, one or more implementations of the present invention also reduce energy waste. The heating assembly can apply energy to the platen assembly only when heat is required during a lamination process. Thus, no energy may be wasted by heating the press between jobs. Furthermore, one or more implementations of the present invention can apply uniform or substantially uniform pressure to a laminate assembly without the use of pressure pads or tooling plates, no energy is wasted through such intermediate layers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A lamination press for heating and pressing together a laminate assembly to form a uniform panel, the lamination press comprising:
   an upper platen assembly; and
   a lower platen assembly;
   wherein each of the upper platen assembly and the lower platen assembly comprises:
      a first flexible plate having a working surface thereon, the first flexible plate being configured to flex relative to the laminate assembly,
      a second flexible plate coupled to the first flexible plate, the second flexible plate being configured to flex together with the first flexible plate, and
      a plurality of grooves disposed in one or more of the first flexible plate and the second flexible plate, the grooves being at least partially sealed between the first flexible plate and the second flexible plate.

2. The lamination press as recited in claim 1, wherein each of the upper platen assembly and the lower platen assembly further comprises a pressure plate, the pressure plate being substantially rigid.

3. The lamination press as recited in claim 2, wherein the upper platen assembly further comprises a flexible pad located between the first plate and the pressure plate, the flexible pad being configured to deform in response to flexing of the first flexible plate.

4. The lamination press as recited in claim 1, further comprising:
   a heating source configured to supply heated medium to the plurality of grooves disposed in one or more of the first flexible plate and the second flexible plate.

5. The lamination press as recited in claim 1, further comprising a frame configured to support the upper and lower platen assemblies thereon.

6. The lamination press as recited in claim 5, further comprising slide rails, wherein the lower platen assembly is configured to slide on the slide rails in and out of alignment with the upper platen assembly.

7. The lamination press as recited in claim 5, further comprising a plurality of air springs configured to move the upper platen assembly toward the lower platen assembly.

8. The platen assembly as recited in claim 7, further comprising one or more actuators configured to move the upper platen assembly away from the lower platen assembly.

9. A platen assembly for use in a lamination press for heating and pressing a laminate assembly to form a uniform panel, the platen assembly comprising:
a substantially rigid plate;
a flexible platen having a working surface and a non-working surface, the working surface being configured to press directly against the laminate assembly,
wherein the flexible platen comprises:
a plurality of plates coupled together, each plate of the plurality of plates being configured to flex about the laminate assembly, and
a plurality of grooves formed in one or more plates of the plurality of plates, the plurality of grooves being configured to accept heating or cooling medium for heating or cooling the flexible platen; and
a flexible pad located between the non-working surface of the flexible platen and the substantially rigid plate.

10. The platen assembly as recited in claim 9, further comprising a plurality of openings passing through one side of the flexible platen, the plurality of openings being connected to the plurality of grooves.

11. The platen assembly as recited in claim 10, further comprising one or more manifold blocks connected to the flexible platen, the manifold blocks being configured to channel a heating or cooling medium to and from the plurality of openings.

12. The platen assembly as recited in claim 11, wherein the manifold comprises a plurality of channels,
wherein:
a first set of one or more channels is configured to channel the heating or cooling medium to a first set of openings, and
a second set of one or more channels is configured to channel the heating or cooling medium to a second set of openings.

13. The platen assembly as recited in claim 9, wherein:
the plurality of plates comprises a first plate and a second plate;
the first plate is coupled to the second plate about a perimeter thereof;
the plurality of grooves defines a plurality of ribs therebetween; and
the first and the second plate are configured to flex about the plurality ribs.

14. The platen assembly as recited in claim 9, further comprising an insulation layer located between the non-working surface of the flexible platen and the flexible pad.

15. A method of forming a unitary panel by applying heat and pressure to a laminate assembly, the method comprising:
placing the laminate assembly onto a working face of a lower platen of a lower plate assembly of a lamination press, the lower platen assembly being positioned at least partially outside of the lamination press;
moving the lower platen assembly into the lamination press and into alignment with an upper platen of an upper platen assembly;
forming the unitary panel by heating and uniformly pressing the laminate assembly between the lower and upper platen assemblies in a manner that allows one or more of the lower and upper platens to flex about the laminate assembly; and
cooling the unitary panel by cooling one or more of the lower platen and the upper platen;
wherein each of the upper platen and the lower platen assembly comprises:
a first flexible plate having a working surface thereon, the first flexible plate being configured to flex relative to the laminate assembly,
a second flexible plate coupled to the first flexible plate, the second flexible plate being configured to flex together with the first flexible plate, and
a plurality of grooves disposed in the first flexible plate and the second flexible plate, the plurality of grooves being at least partially sealed between the first flexible plate and the second flexible plate.

16. The method as recited in claim 15, wherein heating the laminate assembly comprises:
providing a heated medium within the plurality of grooves located in a flexible plate that comprises the upper platen; and
providing a heated medium within the plurality of grooves located in a flexible plate that comprises the lower platen.

17. The method as recited in claim 16, wherein the heated medium flows in opposite directions across the flexible plate that comprises the lower platen.

18. The method as recited in claim 15, wherein cooling one or more of the lower platen and the upper platen comprises:
providing a cooled medium within the plurality of grooves located in a flexible plate that comprises the upper platen; and
providing a cooled medium within thee plurality of grooves located in a flexible plate that comprises the lower platen.

19. The method as recited in claim 15, wherein both the upper platen and the lower platen flex about the laminate assembly.

20. The method as recited in claim 15, wherein:
the upper platen assembly and the lower platen assembly include one or more of an insulation layer and a flexible pad; and
the upper and lower platens flex about the laminate assembly by compressing the one or more of the insulation layer and the flexible of the respective upper and lower platen assemblies.

21. A method of forming a unitary panel by applying heat and pressure to a laminate assembly, the method comprising:
placing the laminate assembly onto a working face of a lower platen of a lower plate assembly of a lamination press, the lower platen assembly being positioned at least partially outside of the lamination press;
moving the lower platen assembly into the lamination press and into alignment with an upper platen of an upper platen assembly;
forming the unitary panel by heating and uniformly pressing the laminate assembly between the lower and upper platen assemblies in a manner that allows one or more of the lower and upper platens to flex about the laminate assembly; and
cooling the unitary panel by cooling one or more of the lower platen and the upper platen;

wherein heating the laminate assembly comprises:
  providing a heated medium within a plurality of grooves located in a flexible plate that comprises the upper platen; and
  providing a heated medium within a plurality of grooves located in a flexible plate that comprises the lower platen.

22. The method as recited in claim 21, wherein the heated medium flows in opposite directions across the flexible plate that comprises the lower platen.

23. The method as recited in claim 21, wherein cooling one or more of the lower platen and the upper platen comprises:
  providing a cooled medium within a plurality of grooves located in a flexible plate that comprises the upper platen; and
  providing a cooled medium within a plurality of grooves located in a flexible plate that comprises the lower platen.

24. The method as recited in claim 21, wherein both the upper platen and the lower platen flex about the laminate assembly.

25. The method as recited in claim 21, wherein:
  the upper platen assembly and the lower platen assembly include one or more of an insulation layer and a flexible pad; and
  the upper and lower platens flex about the laminate assembly by compressing the one or more of the insulation layer and the flexible of the respective upper and lower platen assemblies.

* * * * *

UNITED STATES PATENT AND TRADEMARK OFFICE
CERTIFICATE OF CORRECTION

PATENT NO. : 9,199,439 B2  
APPLICATION NO. : 13/649958  
DATED : December 1, 2015  
INVENTOR(S) : Laker et al.

Page 1 of 1

It is certified that error appears in the above-identified patent and that said Letters Patent is hereby corrected as shown below:

In the specification,

Column 13  
Line 66, change "pads 270a, 270a" to --pads 270a, 270b--

Figure 2C:
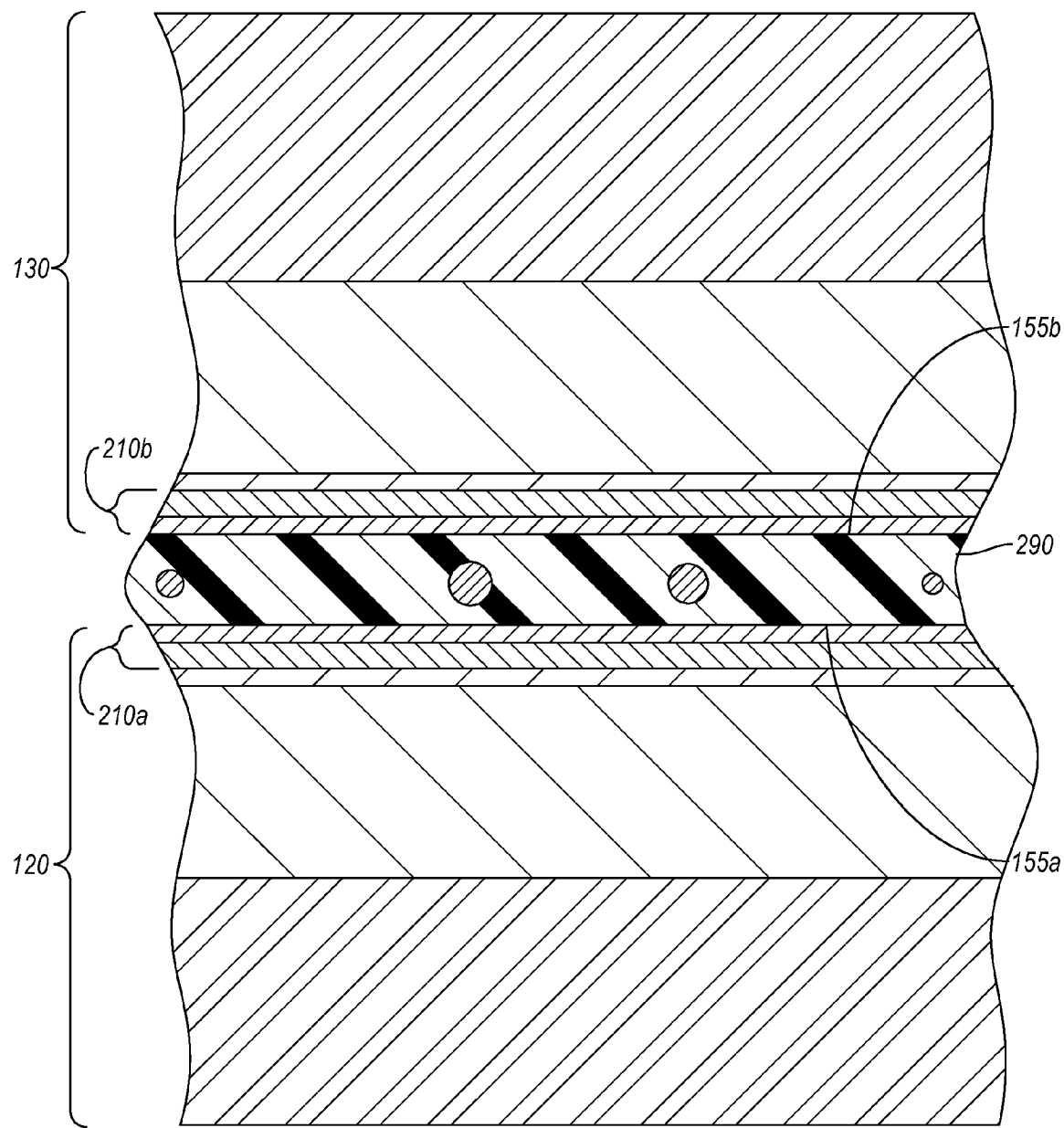
FIG. 2C illustrates a unitary product positioned between the upper platen assembly and the lower platen assembly in accordance with one implementation of the present invention.

Column 14  
Line 43, change "FIG. 2B illustrates" to --FIG. 2C illustrates--

Column 17  
Line 3, change "channels 350a" to --channel 350a--  
Line 20, change "can except flow" to --can accept flow--

Column 19  
Line 7, change "opposing plate can" to --opposing plates can--

Signed and Sealed this  
Ninth Day of August, 2016

Michelle K. Lee  
*Director of the United States Patent and Trademark Office*